(12) United States Patent
Murakami et al.

(10) Patent No.: US 8,976,643 B2
(45) Date of Patent: Mar. 10, 2015

(54) WIRELESS COMMUNICATION METHOD AND TRANSMISSION APPARATUS

(71) Applicant: Panasonic Corporation, Osaka (JP)

(72) Inventors: Yutaka Murakami, Osaka (JP);
Shinichiro Takabayashi, Tokyo (JP);
Masayuki Orihashi, Kanagawa (JP);
Akihiko Matsuoka, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 55 days.

(21) Appl. No.: 13/780,869

(22) Filed: Feb. 28, 2013

(65) Prior Publication Data

US 2013/0176965 A1    Jul. 11, 2013

Related U.S. Application Data

(63) Continuation of application No. 12/645,659, filed on Dec. 23, 2009, now abandoned, which is a continuation of application No. 12/175,532, filed on Jul. 18, 2008, now Pat. No. 7,664,011, which is a continuation of application No. 10/486,916, filed as application No. PCT/JP02/08451 on Aug. 22, 2002, now Pat. No. 7,420,915.

(30) Foreign Application Priority Data

Aug. 27, 2001  (JP) ................. 2001-257027
Aug. 8, 2002   (JP) ................. 2002-231976

(51) Int. Cl.
*H04J 11/00* (2006.01)
*H04W 4/00* (2009.01)
(Continued)

(52) U.S. Cl.
CPC ............ *H04L 5/0058* (2013.01); *H04B 1/692* (2013.01); *H04L 1/0001* (2013.01);
(Continued)

(58) Field of Classification Search
CPC ...... H04B 1/692; H04B 7/0434; H04B 1/707; H04B 1/713; H04L 1/0001; H04L 5/0007; H04L 5/0021; H04L 5/0058; H04L 5/0075; H04L 27/0008; H04L 1/0618; H04L 25/0204; H04L 27/2647; H04L 27/2662; H04L 27/2626; H04L 1/04; H04L 27/2601; H04L 5/023; H04L 27/2608; H04W 72/0453; H04J 13/00; H04J 13/10
USPC .................................. 370/208–356
See application file for complete search history.

(56) References Cited

U.S. PATENT DOCUMENTS 4,627,077 A    12/1986  Armstrong
4,785,442 A    11/1988  Ohtake et al.
(Continued)

FOREIGN PATENT DOCUMENTS

CN    1234661    11/1999
EP    0954192    11/1999
(Continued)

OTHER PUBLICATIONS

European Search Report that issued with respect to European Patent Application No. 02 76 0694, mailed Aug. 28, 2009.
(Continued)

*Primary Examiner* — Venkatesh Haliyur
(74) *Attorney, Agent, or Firm* — Greenblum & Bernstein, P.L.C.

(57) ABSTRACT

A wireless communication method for a transmission apparatus that transmits an OFDM (orthogonal frequency division multiplexing) signal using a communication band, which comprises a plurality of subcarrier groups each including a plurality of subcarriers. The method includes specifying which subcarrier group and how many subcarriers are to be used to transmit the OFDM signal, determining a configuration of a transmission frame, generating the OFDM signal by mapping data symbols according to the determined configuration of the transmission frame, and transmitting the generated OFDM signal.

8 Claims, 35 Drawing Sheets

(51) Int. Cl.
| | |
|---|---|
| *H04B 7/02* | (2006.01) |
| *H04L 5/00* | (2006.01) |
| *H04B 1/692* | (2011.01) |
| *H04L 1/00* | (2006.01) |
| *H04L 27/00* | (2006.01) |
| *H04W 72/04* | (2009.01) |

(52) U.S. Cl.
CPC ............ *H04L 5/0007* (2013.01); *H04L 5/0021* (2013.01); *H04L 5/0075* (2013.01); *H04L 27/0008* (2013.01); *H04W 72/0453* (2013.01); *H04L 5/006* (2013.01); *H04L 5/0064* (2013.01); *H04L 5/0092* (2013.01)
USPC ........... 370/208; 370/204; 370/228; 370/329; 370/331; 375/267; 375/347

(56) References Cited

U.S. PATENT DOCUMENTS

| | | | |
|---|---|---|---|
| 4,924,516 A | 5/1990 | Bremer et al. | |
| 5,438,289 A | 8/1995 | Kan et al. | |
| 5,577,087 A | 11/1996 | Furuya | |
| 5,867,478 A | 2/1999 | Baum et al. | |
| 6,545,997 B1 | 4/2003 | Bohnke et al. | |
| 6,726,297 B1 | 4/2004 | Uesugi | |
| 6,744,828 B1 | 6/2004 | Uchiyama et al. | |
| 6,836,484 B2 | 12/2004 | Suzuki | |
| 6,870,808 B1 | 3/2005 | Liu et al. | |
| 6,882,618 B1 | 4/2005 | Sakoda et al. | |
| 6,904,283 B2 | 6/2005 | Li et al. | |
| 6,937,558 B2 | 8/2005 | Wakutsu | |
| 6,985,434 B2 | 1/2006 | Wu et al. | |
| 7,012,908 B2 | 3/2006 | Sasaki | |
| 7,020,218 B2 | 3/2006 | Arnesen | |
| 7,058,140 B2 | 6/2006 | Smart et al. | |
| 7,139,534 B2 | 11/2006 | Tanabe et al. | |
| 7,212,793 B2 | 5/2007 | Kogawa et al. | |
| 7,420,915 B2* | 9/2008 | Murakami et al. | 370/204 |
| 7,430,257 B1* | 9/2008 | Shattil | 375/347 |
| 7,447,277 B2 | 11/2008 | Yajima et al. | |
| 7,664,011 B2* | 2/2010 | Murakami et al. | 370/208 |
| 7,719,969 B1 | 5/2010 | Dropps et al. | |
| 7,876,752 B1 | 1/2011 | Rimmer et al. | |
| 7,907,509 B2* | 3/2011 | Koga et al. | 370/208 |
| 8,509,323 B2* | 8/2013 | Nangia et al. | 375/260 |
| 8,606,287 B2 | 12/2013 | Landau et al. | |
| 8,693,429 B2* | 4/2014 | Montojo et al. | 370/330 |
| 2002/0041637 A1 | 4/2002 | Smart et al. | |
| 2002/0119781 A1 | 8/2002 | Li et al. | |
| 2002/0159430 A1 | 10/2002 | Atarashi et al. | |
| 2003/0026201 A1 | 2/2003 | Arnesen | |
| 2003/0053413 A1 | 3/2003 | Sawahashi et al. | |
| 2003/0095506 A1 | 5/2003 | Jalali et al. | |
| 2004/0071105 A1 | 4/2004 | Maeda et al. | |
| 2004/0141481 A1 | 7/2004 | Lee et al. | |
| 2004/0142696 A1 | 7/2004 | Saunders et al. | |
| 2005/0013352 A1* | 1/2005 | Hottinen | 375/219 |
| 2005/0078768 A1 | 4/2005 | Sun et al. | |
| 2005/0157815 A1 | 7/2005 | Kim et al. | |
| 2005/0163252 A1 | 7/2005 | McCallister et al. | |
| 2006/0188032 A1 | 8/2006 | Kim et al. | |
| 2007/0081484 A1* | 4/2007 | Wang | 370/315 |
| 2007/0165700 A1 | 7/2007 | Chin Po Shin et al. | |
| 2007/0201398 A1 | 8/2007 | Yang et al. | |
| 2007/0211821 A1 | 9/2007 | Haque et al. | |
| 2008/0159428 A1 | 7/2008 | Shinozaki | |
| 2009/0017757 A1* | 1/2009 | Koga et al. | 455/62 |
| 2009/0060064 A1 | 3/2009 | Futaki et al. | |
| 2010/0246527 A1* | 9/2010 | Montojo et al. | 370/330 |
| 2010/0322073 A1 | 12/2010 | Namba et al. | |
| 2010/0329134 A1 | 12/2010 | Doppler et al. | |

FOREIGN PATENT DOCUMENTS

| | | |
|---|---|---|
| JP | 3-133958 | 6/1991 |
| JP | 5-130082 | 5/1993 |
| JP | 10-322306 | 12/1998 |
| JP | 11-027231 | 1/1999 |
| JP | 11-313357 | 11/1999 |
| JP | 11-346203 | 12/1999 |
| JP | 2001-103032 | 4/2001 |
| JP | 2001-189769 | 7/2001 |
| JP | 2001-203664 | 7/2001 |
| JP | 2001-203665 | 7/2001 |
| JP | 2001-217761 | 8/2001 |
| JP | 2001-238269 | 8/2001 |
| JP | 2001-320346 | 11/2001 |

OTHER PUBLICATIONS

Chinese Office Action that issued with respect to patent family member Chinese Patent Application No. 02816919.0, mailed Apr. 21, 2010.

An article by Sawayama, M. et al., entitled "Broadband TD-OFCDM Packet Transmission Using Variable Spreading Factor" published at p. 495 of The Institute of Electronics , Information and Communication Engineers, Tsushin 1, Mar. 7, 2001.

Rohling et al., "Performance comparison of different multiple access schemes for the downlink of an OFDM communication system," Vehicular Technology Conference, 1997 IEEE 47th May, 1997, vol. 3, pp. 1365-1369.

Wong et al., "Multiuser OFDM with adaptive subcarrier, bit, and power allocation," IEEE Journal on Selected Areas in Communications, vol. 17, No. 10, pp. 1747-1758, Oct. 1999.

Fu et al., "A Programmable Transceiver Structure of Multi-Rate OFDM-CDMA for Wireless Multimedia Communications", VTC 2001 Spring, IEEE VTS 53rd, Vehicular Technology Conference, Rhodes, Greece, May 6-9, 2001; IEEE Vehicular Technology Conference, New York, NY, IEEE, US, vol. Conf. 53, May 6, 2001, pp. 1942-1946, XP001082482, ISBN: 978-0-7803-6728-9, May 6, 2001.

Atarashi et al., "Broadband Packet Wireless Access Appropriate for High-Speed and High-Capacity Throughput", VTC 2001 Spring, IEEE VTS 53rd Vehicular Technology Conference, Rhodes, Greece, May 6-9, 2001; IEEE Vehicular Technology Conference, New York, NY, IEEE, US, vol. 53, May 6, 2001, pp. 566-570, XP001067023, ISBN: 978-0-7803-6728-9, May 6, 2001.

Akihir Kajiwara, "Effects of Polarization, Antenna Directivity, and Room Size on Delay Spread in LOS Indoor Radio Channel", IEEE Transactions on Vehicular Technology, IEEE Service Center, Piscataway, NJ, US, vol. 46, No. 1, Feb. 1997, XP011063548, ISSN: 0018-9545, Feb. 1997.

Official Action in U.S. Appl. No. 13/079,384, mailed Jan. 17, 2013.
Office Action in U.S. Appl. No. 13/079,384, mailed Aug. 21, 2013.
Final Official Action, dated Jul. 1, 2013, in related U.S. Appl. No. 12/645,659.
U.S. Office Action, dated Aug. 19, 2014 in related U.S. Appl. No. 14/153,466.

* cited by examiner

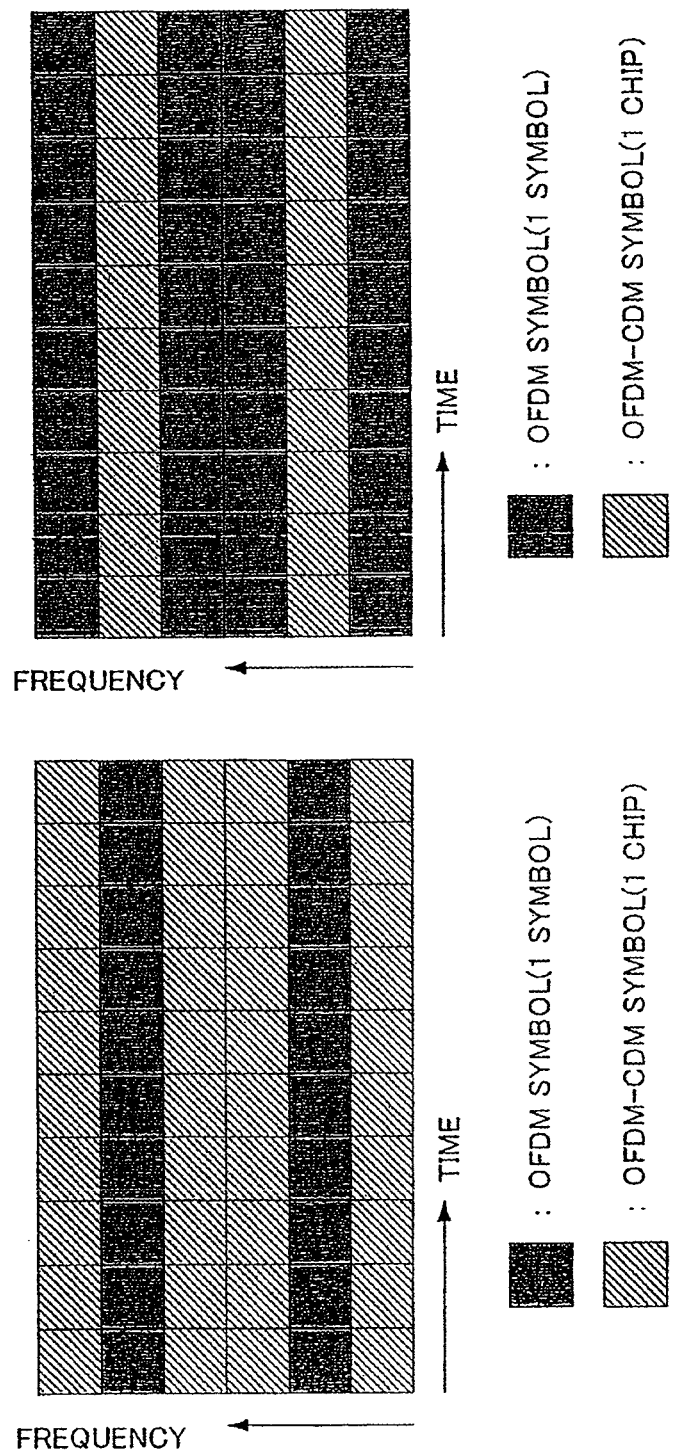

WIRELESS COMMUNICATION METHOD AND TRANSMISSION APPARATUS

CROSS REFERENCE TO RELATED APPLICATIONS

This application is a continuation application of pending U.S. patent application Ser. No. 12/645,659, filed Dec. 23, 2009, which is a continuation application of U.S. patent application Ser. No. 12/175,532, filed Jul. 18, 2008, now U.S. Pat. No. 7,664,011, issued Feb. 16, 2010 which is a continuation application of U.S. patent application Ser. No. 10/486,916, filed Feb. 23, 2004, now U.S. Pat. No. 7,420,915, issued Sep. 2, 2008 which is a U.S. National Stage application of International Application No. PCT/JP02/08451, filed Aug. 22, 2002, the disclosures of which are expressly incorporated by reference herein. The International application was not published under PCT Article 21 (2) in English.

This application claims priority of Japanese Patent Application Nos. 2001-257027, filed Aug. 27, 2001 and 2002-231976 filed Aug. 8, 2002, the disclosures of which are expressly incorporated by reference herein.

FIELD OF THE INVENTION

The present invention relates to a wireless communications apparatus and a wireless communications method applicable to a wireless communications system in which wireless transmission of information with high rate and high quality is required.

BACKGROUND ART

Conventionally, various kinds of methods have been proposed and realized as a method for achieving high-speed and high-quality wireless transmission of a large hulk of information such as image information, etc. For example, according to a CDMA scheme, transmission data is subjected to spread processing by using a spreading code corresponding to each communications terminal for transmission thereof. In the CDMA scheme, this makes it possible to reduce interferences between transmission signals on wireless propagation paths, thereby making it further possible to obtain high-quality reception signals at receiver sides.

Recently, an OFDM-CDMA scheme, which is a combination of an OFDM modulation scheme and a CDMA scheme, has been drawing attention. The OFDM-CDMA scheme is broadly categorized into a time domain spreading scheme and a frequency domain spreading scheme. Herein, the frequency domain spreading scheme is explained.

FIG. 1 is a schematic diagram illustrating the state of digital symbols before modulation processing; whereas FIG. 2 is a schematic diagram illustrating the layout of respective chips after modulation processing in the frequency domain spreading scheme. According to the frequency domain spreading scheme, each one symbol of N digital symbols which make up a serial data sequence (FIG. 1) is multiplied by a spreading code having a spreading factor of M. After spreading, M chips in parallel are subjected to IFFT processing sequentially on a symbol-by-symbol basis. As its result, N OFDM symbols for M sub-carriers are generated. That is, in the frequency domain spreading scheme, chips after spreading are aligned along the direction of the frequency axis (FIG. 2). In other words, the chips after spreading are placed on different sub-carriers respectively.

Here, if it is assumed that one digital symbol before modulation processing occupies a radio resource of a time width T and a frequency band width B (FIG. 1), it follows that, after the modulation processing, one chip occupies a time width of N×T and a frequency band width of B/N. Therefore, the area occupied in a time-frequency domain per one digital symbol becomes M×T×B after the modulation processing, which is M times of the area occupied by the one digital symbol before the modulation processing.

Herein, if it is assumed that the number of digital symbols N=8, and the spreading factor of M=8, are taken as an example, the signal pattern of OFDM symbols generated according to the frequency domain spreading scheme would be as illustrated in FIG. 3. As shown in this drawing, in the frequency domain spreading scheme, eight OFDM symbols are sequentially generated from t0 through t7, each corresponding to its counterpart of eight digital symbols differentiated from each other with different black/white shades and patterns on a time axis. During such a generating process, eight chips for each digital symbol are allocated to different sub-carriers f1~f8 respectively.

By combining the OFDM modulation scheme and the CDMA modulation scheme as described above, it is possible to achieve an effective reuse, or to produce an effective statistical multiplexing effect. In addition to that, it is possible to realize a high-speed data transmission which is faster than under a single-carrier CDMA transmission. It is noted that, the "reuse" means that an identical frequency is made usable both in adjacent cells. Also note that, the "statistical multiplexing effect" means such an efficiency that a greater number of user signals are accommodated in comparison with under consecutive transmission, where such accommodation is made possible in conditions where timings at which a user has some data to transmit and timings at which the user does not have any data to transmit occur randomly in varying occurrences from user to user, achieved by the reduction of energy during time periods in which both communications parties do not transmit data.

By the way, recently, there have been demands for real-time transmission of large-capacity data such as moving pictures, etc. In order to realize such transmission, it is necessary to transmit data in a very high transmission rate by using a limited range of frequency bands.

Though it is true that the OFDM-CDMA scheme offers a high-quality data transmission with a relatively high transmission rate, faster communications is demanded as described above.

DESCRIPTION OF THE INVENTION

An object of the present invention is to provide a wireless communications apparatus and a wireless communications method featuring a great excellence in terms of high-quality transmission and high-speed transmission.

This object is achieved by applying an OFDM modulation, which enables high-speed transmission, to transmission data, while applying an OFDM-spread modulation, which excels in terms of transmission quality though it is a little inferior to the OFDM modulation in terms of the high-speed transmission to some degree, to the transmission data, and by selectively assigning OFDM signals and OFDM-spread signals (hereafter, the OFDM-spread signal is referred to as "OFDM-CDM signal") which are generated in accordance with these two modulation schemes to a transmission destination station and by transmitting thereof. Then, at a communications terminal, it is possible to achieve both high-speed reception and high-quality reception in a compatible manner by adaptively selecting and demodulating either of these two signals depending on its reception environment.

BRIEF DESCRIPTION OF THE DRAWINGS

FIG. 5A is a diagram illustrating a configuration example of a communications frame according to the present invention;

FIG. 5B is a diagram illustrating a configuration example of a communications frame according to the present invention;

BEST MODE FOR CARRYING OUT THE INVENTION

Embodiments of the present invention will be described in detail below with reference to the accompanying drawings.
(Embodiment 1)

Figure 1:
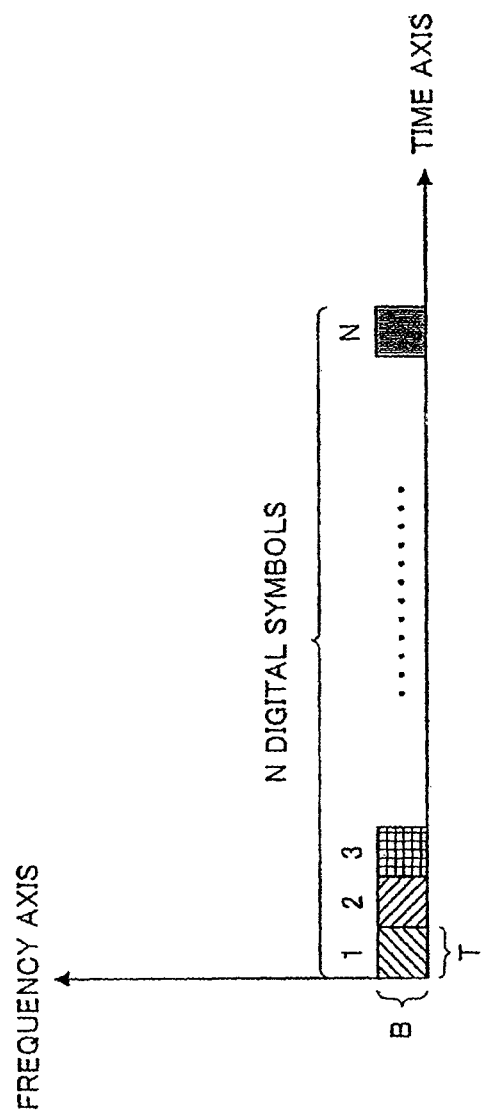
FIG. 1 is a diagram illustrating the state of digital symbols before OFDM-CDM processing.
Figure 2:
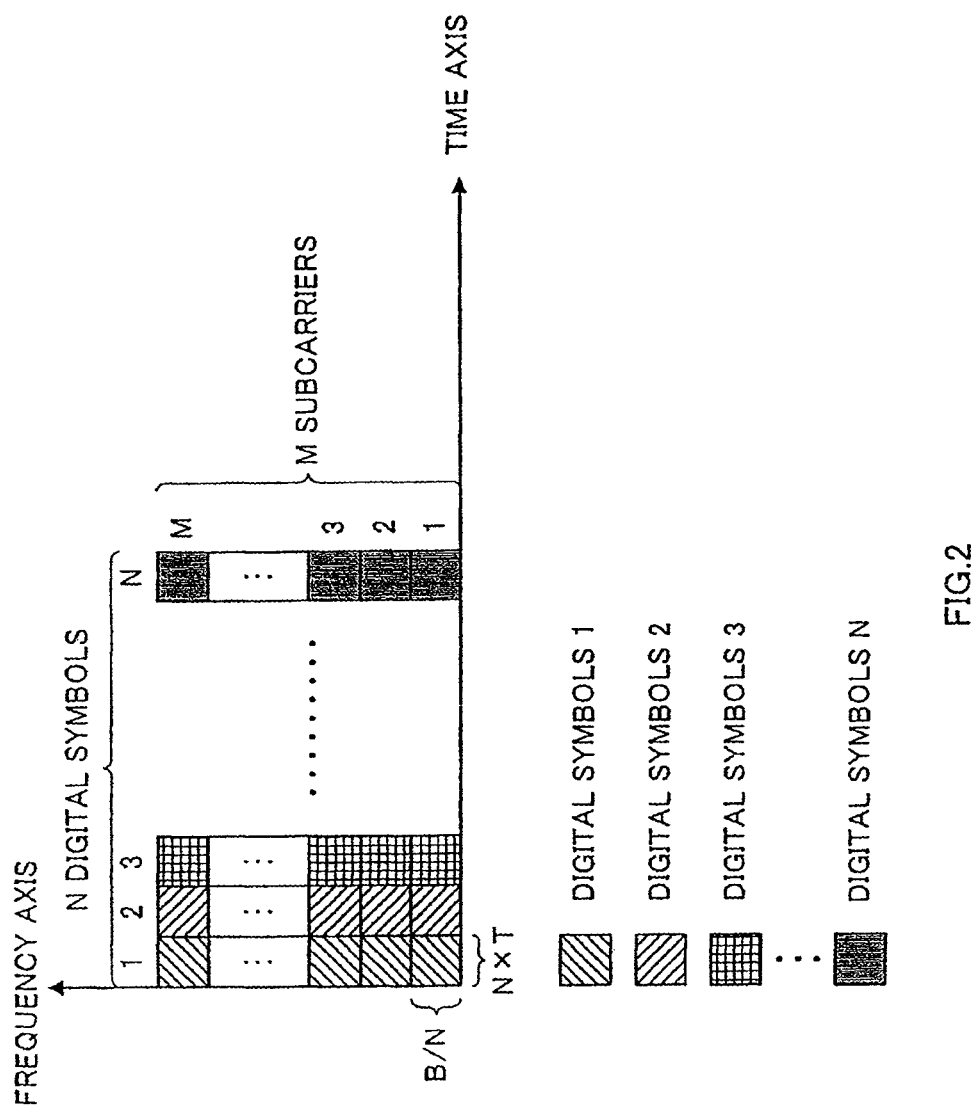
FIG. 2 is a diagram illustrating the layout of respective chips after modulation processing according to a frequency domain spreading scheme.
Figure 3:
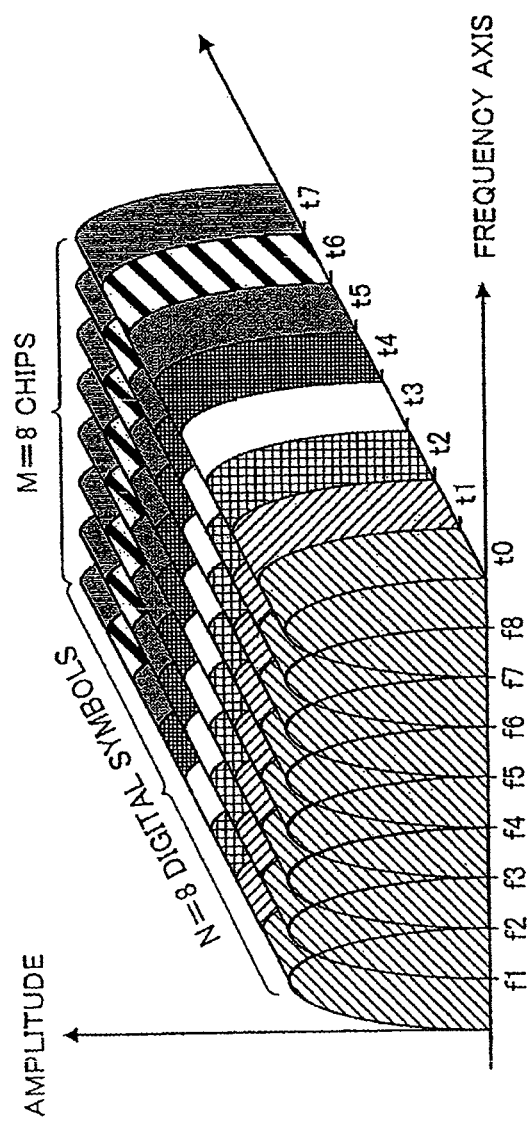
FIG. 3 is a diagram illustrating the signal pattern of OFDM symbols generated according to a frequency domain spreading scheme.
Figure 4B:
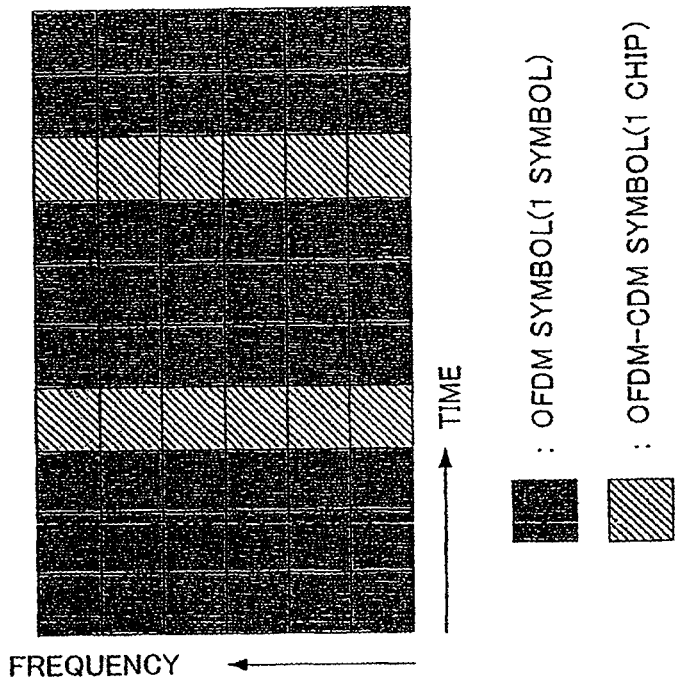
FIG. 4B is a diagram illustrating a configuration example of a communications frame according to the present invention.
Figure 4A:
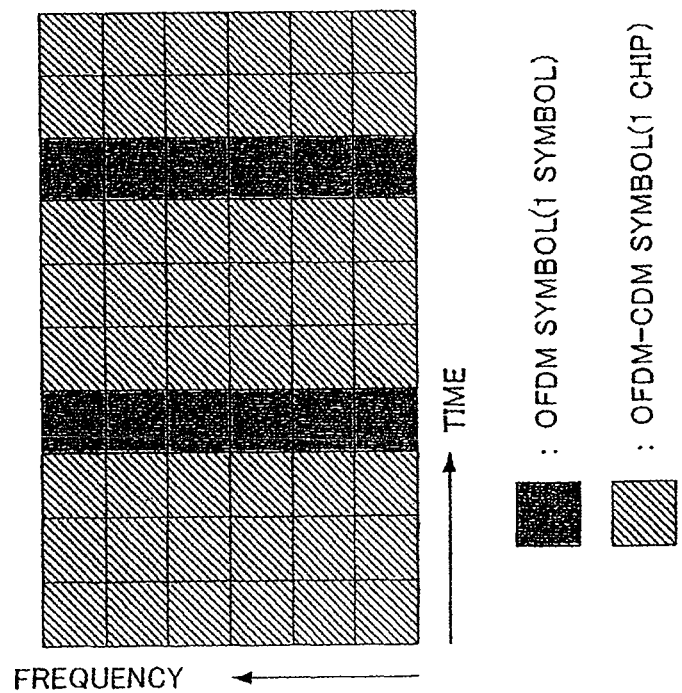
FIG. 4A is a diagram illustrating a configuration example of a communications frame according to the present invention.

In this embodiment, two transmission methods are proposed. The first method is a method for transmitting OFDM signals and OFDM-CDM signals with each signal allotted to each different time under the frame configuration of transmission signals as illustrated in FIG. 4A and FIG. 4B, where the OFDM signal and the OFDM-CDM signal are placed in a mixed manner on an identical frequency band when viewed on frequency-time axial relationships, and either one of the signals is aligned along the direction of the frequency axis at each point in time when viewed on the same relationships. This makes it possible for a communications terminal side to selectively receive and demodulate OFDM signals or OFDM-CDM signals by selectively extracting a signal at each point in time.

The second method is a method for transmitting OFDM signals and OFDM-CDM signals with both types of the two signals allotted to an identical time under the frame configuration of transmission signals as illustrated in FIG. 5A and FIG. 5B, where the OFDM signal and the OFDM-CDM signal are placed in a mixed manner on an identical time when viewed on frequency-time axial relationships, and either one of the signals is aligned along the direction of the time axis at each frequency band when viewed on the same relationships. This makes it possible for a communications terminal side to selectively receive and demodulate OFDM signals or OFDM-CDM signals by selectively extracting a signal at each frequency band.

Figures 6A, 6B:
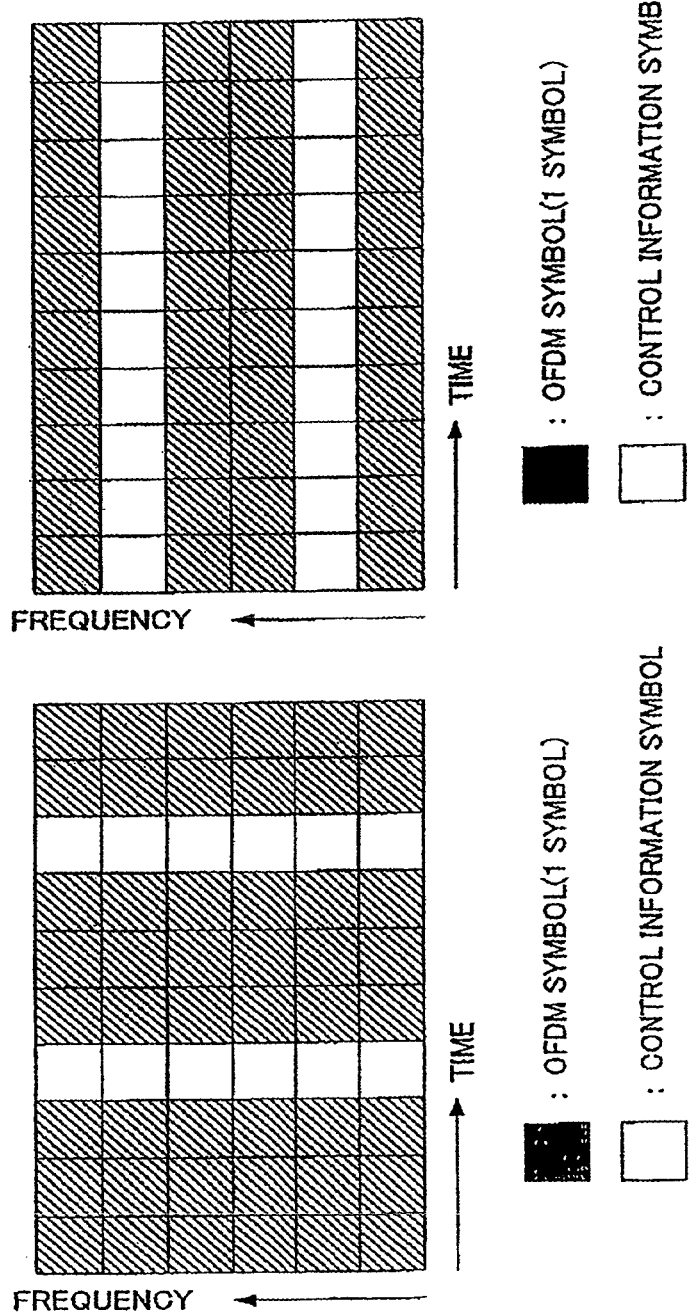
FIG. 6A is a diagram illustrating a layout example of control information symbols carrying frame configuration information in a communications frame.
FIG. 6B is a diagram illustrating a layout example of control information symbols carrying frame configuration information in a communications frame.

Further, as illustrated in FIG. 6, control information symbols are aligned therein and are sent together with OFDM signals and OFDM-CDM signals, where such a symbol contains frame configuration information indicating at which positions the OFDM signals are placed in the transmission frame and at which positions the OFDM-CDM signals are placed in the same.

Figure 7:
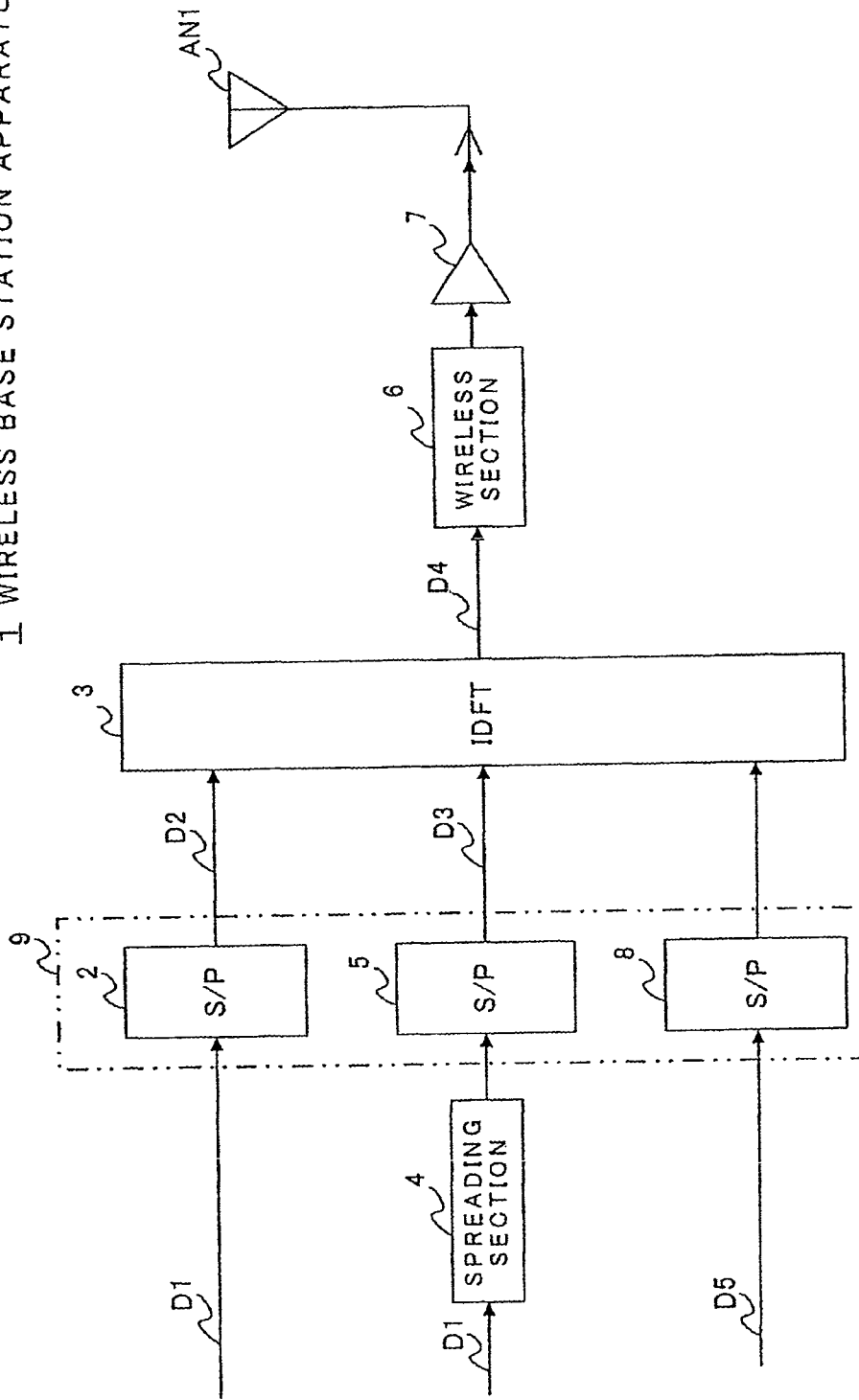
FIG. 7 is a block diagram illustrating the configuration of a wireless base station apparatus according to Embodiment 1 of the present invention.

In FIG. 7, reference numeral 1 denotes the configuration of a wireless base station apparatus according to Embodiment 1 of the present invention as a whole. Wireless base station apparatus 1 accepts the input of a transmission digital signal D1 at serial/parallel converting section (S/P) 2. Meanwhile, after spreading of a transmission digital signal D1 by means of a predefined spreading code at spreading section 4, wireless base station apparatus 1 accepts the input of the spread signal at serial/parallel converting section (S/P) 5. In addition, wireless base station apparatus 1 accepts the input of a frame configuration signal D5 at serial/parallel converting section (S/P) 8, where the signal D5 indicates a frame configuration for a case where OFDM signals and OFDM-CDM modulation signals are mixed.

Herein, serial/parallel converting sections (S/P) 2, 5, and 8 form frame configuration section 9, which functions as means for frame configuration. That is, frame configuration section 9 performs serial-to-parallel conversion processing on transmission data so as to configure a transmission frame in which OFDM signals and OFDM-CDM signals are mixed as illustrated in FIG. 4A, FIG. 4B, FIG. 5A, or FIG. 6B.

For example, as illustrated in FIG. 4A and FIG. 4B, in a case where a transmission frame is configured in such a way that OFDM signals and OFDM-CDM signals are placed in a mixed manner on an identical frequency band and either one of the signals is aligned along the direction of the frequency axis at each point in time, wireless base station apparatus 1 outputs parallel signal D2, which is obtained by performing serial-to-parallel conversion on transmission digital signal D1 to split it into the number of sub-carriers, from serial/parallel converting section (S/P) 2 at some points in time. Then, at some other points in time, wireless base station apparatus 1 outputs parallel signal D3, which is obtained by performing serial-to-parallel conversion on spread transmission digital signal D1 to split it into the number of sub-carriers, from serial/parallel converting section (S/P) 5.

Additionally, for example, as illustrated in FIG. 5A and FIG. 5B, it is possible to configure a transmission frame in which the OFDM signals and the OFDM-CDM signals are placed in a mixed manner on an identical time and either one of the signals is aligned along the direction of the time axis at each frequency band, where such a configuration is achieved by, for example, outputting 2 streams of parallel signal D2 for 2 sub-carriers from serial/parallel converting section (S/P) 2 while outputting 4 streams of parallel signal D3 for 4 sub-carriers from serial/parallel converting section (S/P) 5.

By performing inverse discrete Fourier transform processing on inputted parallel signals D2, D3, and frame configuration parallel signals, Inverse Discrete Fourier Transform (IDFT) section forms transmission data D4 in which frame configuration information signals, OFDM signals, OFDM-CDM modulation signals are mixed.

In this way, serial/parallel converting section (S/P) 2 and Inverse Discrete Fourier Transform (IDFT) 3 combine to function as OFDM modulation means for forming OFDM signals by performing orthogonal frequency division multiplexing processing on transmission signals. In addition, spreading section 4, serial/parallel converting section (S/P) 5, and Inverse Discrete Fourier Transform (IDFT) 3 combine to function as OFDM-spread modulation means for forming OFDM-CDM signals by performing spreading processing and orthogonal frequency division multiplexing processing on transmission signals.

Wireless section 6 performs predetermined radio processing such as digital-to-analog conversion, up-conversion, etc. on transmission signal D4 in which OFDM signals and OFDM-CDM signals are mixed, and sends out the processed signals to transmission power amplifying section 7. The signal amplified at transmission power amplification section 7 is sent out to antenna AN 1. In this way, mixed signals containing OFDM signals and OFDM-CDM modulation signals are transmitted from wireless base station apparatus 1.

Figure 8:
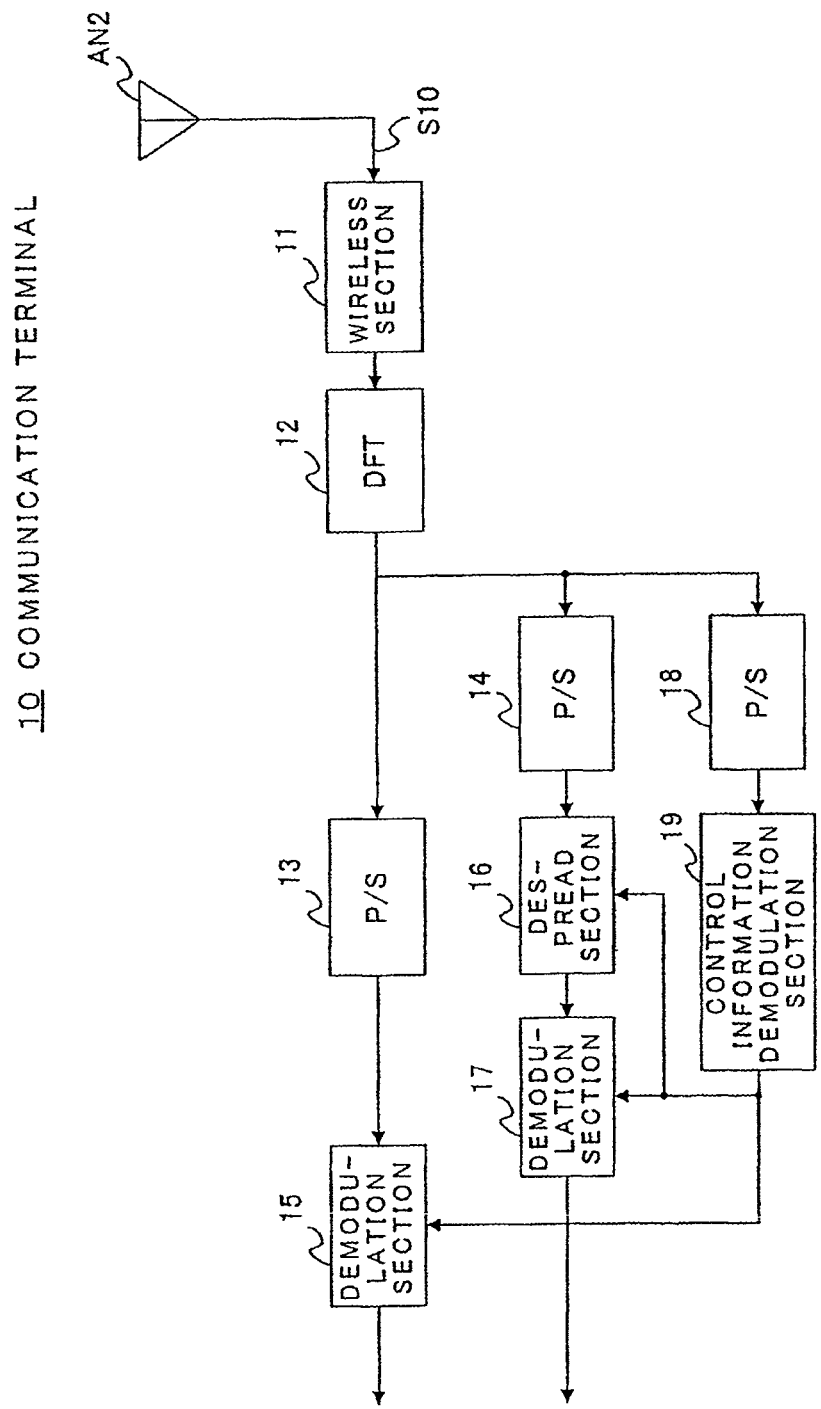
FIG. 8 is a block diagram illustrating the configuration of a communications terminal according to Embodiment 1.

Next, the configuration of a communications terminal which receives mixed signals containing OFDM signals and OFDM-CDM signals sent from wireless base station apparatus 1 is illustrated in FIG. 8. Communications terminal 10 accepts the input of reception signal S10 containing the mixture of OFDM signals and OFDM-CDM signals received by antenna AN 2 into wireless section 11. After performing predetermined radio processing such as down-conversion, analog-to-digital conversion processing, etc. on reception signal S10, wireless section 11 sends out the processed signal to Discrete Fourier Transform (DFT) section 12.

Discrete Fourier Transform section 12 performs discrete Fourier transform processing on reception mixture signals, and sends reception parallel signals obtained by the DFT processing to each of parallel/serial (P/S) converting sections 13, 14, and 18. Receiving the reception parallel signal as its input, parallel/serial converting section 13 converts a signal which corresponds to an OFDM-modulated signal at the transmission side into a serial signal, and sends the converted signal out to the next section, that is, demodulation section 15. Demodulation section 15 performs demodulation processing such as QPSK demodulation on inputted signals. This allows transmission data before being subjected to OFDM modulation to be recovered.

On an another line, receiving the reception parallel signal as its input, parallel/serial converting section 14 converts a signal which corresponds to an OFDM-CDM-modulated signal at the transmission side into a serial signal, and sends the converted signal out to the next section, that is, despread section 16. Despread section 16 performs despread processing on inputted serial signals by using the same spread code as that used at the transmission side, and sends out the despread signal to demodulation section 17. Demodulation section 17 performs demodulation processing such as QPSK demodulation on inputted signals. This allows transmission data before being subjected to OFDM-CDM modulation to be recovered.

In addition, parallel/serial converting section 18 performs parallel-to-serial conversion on a reception parallel signal to send it out to control information demodulation section 19. Control information demodulation section 19 demodulates frame configuration information. The frame configuration information is used as control information for demodulation section 15, despread section 16, and demodulation section 17. This allows demodulation section 15 to demodulate OFDM signals only out of mixed signals containing the OFDM signals and OFDM-CDM signals. Likewise, this allows despread section 16 and demodulation section 17 to demodulate OFDM-CDM signals only out of mixed signals containing OFDM signals and the OFDM-CDM signals.

Figure 9:
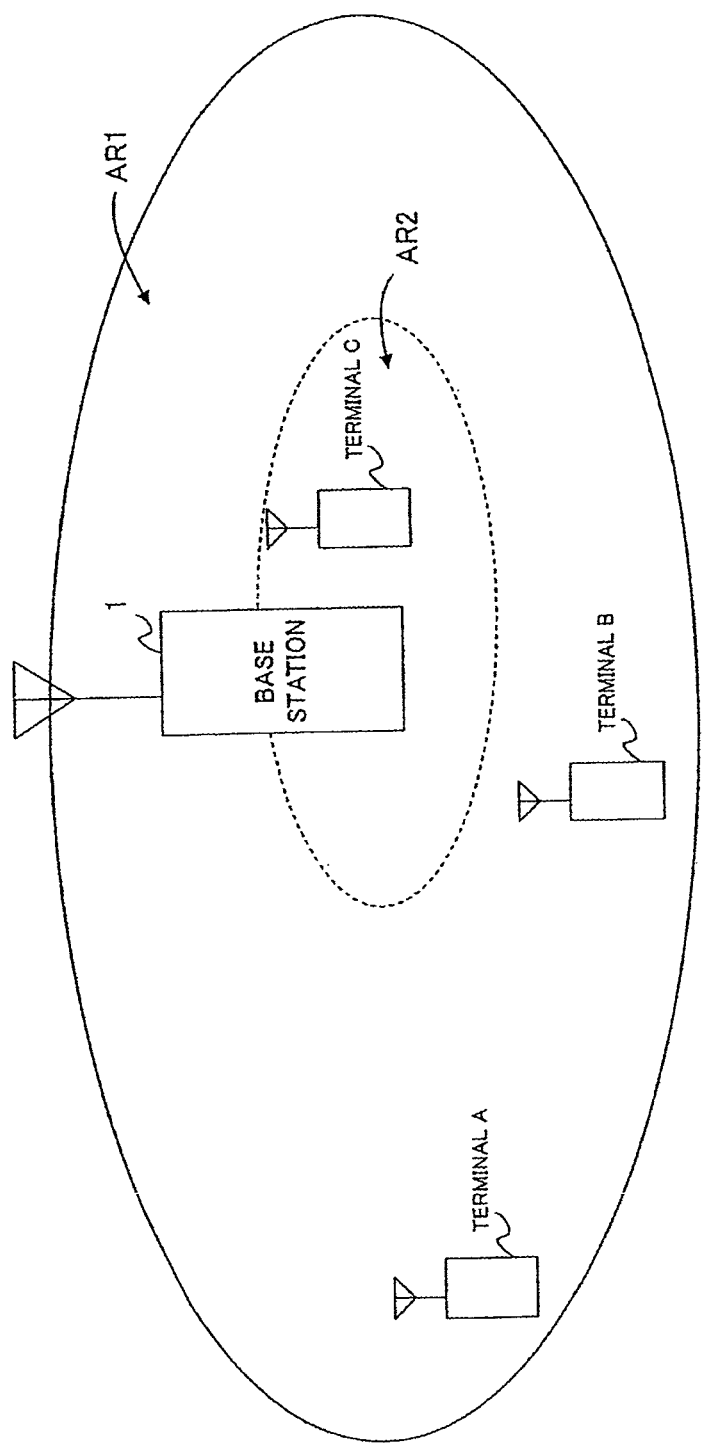
FIG. 9 is a diagram illustrating the location of wireless base station apparatus and the locations of communication terminals, presented to support descriptions of the operation according to Embodiment 1.

Next, with reference to FIG. 9, the operation of Embodiment 1 is explained. Here, it is assumed that communications terminal A and communications terminal B are located at positions which are remote from wireless base station apparatus 1, whereas communications terminal C is located at a position which is relatively close to wireless base station apparatus 1. The area inside the circle shown with a solid ellipse represents an area AR 1 where it is possible to receive OFDM-CDM signals with a high quality, while the area inside the circle shown with a dotted ellipse represents an area AR 2 where it is possible to receive OFDM signals with a high quality. This difference in coverage areas is attributable to whether a spectrum spread scheme is used or not.

As described above, wireless base station apparatus 1 originates mixture signals in which OFDM signals and OFDM-CDM signals are mixed to each of communications terminals A-C. Under such conditions, because it is possible to receive OFDM signals with a good quality at communications terminal C which is located at a relatively closer position to wireless base station apparatus 1, it is possible thereat to use signals originated by employing an OFDM modulation scheme as recovered data.

In contrast, because it is not possible to receive OFDM-modulated signals with a good quality at communications terminals A and B each of which is located at a relatively farther position away from wireless base station apparatus 1, it follows that signals originated by employing an OFDM-CDM modulation scheme are used thereat as recovered data.

By this means, it is possible for communications terminal C to acquire reception data both with a good reception quality and with a high transmission rate. On the other hand, at communications terminals A and B, it is possible to acquire reception data with a good reception quality although its transmission rate is a little inferior to that of communications terminal C.

Herein, assuming a case where signal transmission is done by using an OFDM scheme only, although it is possible for all of communication terminals A-C to receive signals at a high transmission rate, there is a fear of a substantial decrease in transmission efficiency due to degradation in reception quality at communications terminals A and B which are remote from wireless base station apparatus 1, which might end up in requiring retransmission of the same data. Assuming another case where signal transmission is done by using an OFDM-CDM scheme only, although it is possible for all of communication terminals A-C to receive signals with a good reception quality, its transmission rate will be lower in comparison with a case where an OFDM scheme is employed.

Thus, according to the above configuration, it is possible to realize wireless base station apparatus 1 and a wireless communications method for achieving both high-speed and high-quality communications in a compatible manner, which is realized by performing OFDM modulation and OFDM-CDM modulation on transmission data and by transmitting mixed signals which contain the mixture of two types of modulation signals formed by the two modulation schemes, that is, OFDM signals and OFDM-CDM signals.

(Embodiment 2)

This embodiment proposes the switching of modulation schemes for signals addressed to each communication terminal in advance between OFDM signals and OFDM-CDM signals in accordance with estimated radio propagation conditions with communication terminals at other ends, which includes, for example, reception electric field intensity, Doppler frequency, disturbance wave intensity, multi-path conditions, delay profile, direction of arrival, polarization conditions, and so forth.

In addition, this embodiment further proposes the switching of modulation schemes for signals addressed to each communication terminal in advance between OFDM signals and OFDM-CDM signals in accordance with a requested transmission rate, requested modulation scheme, requested transmission quality and so on from the communications terminal.

Figure 10:
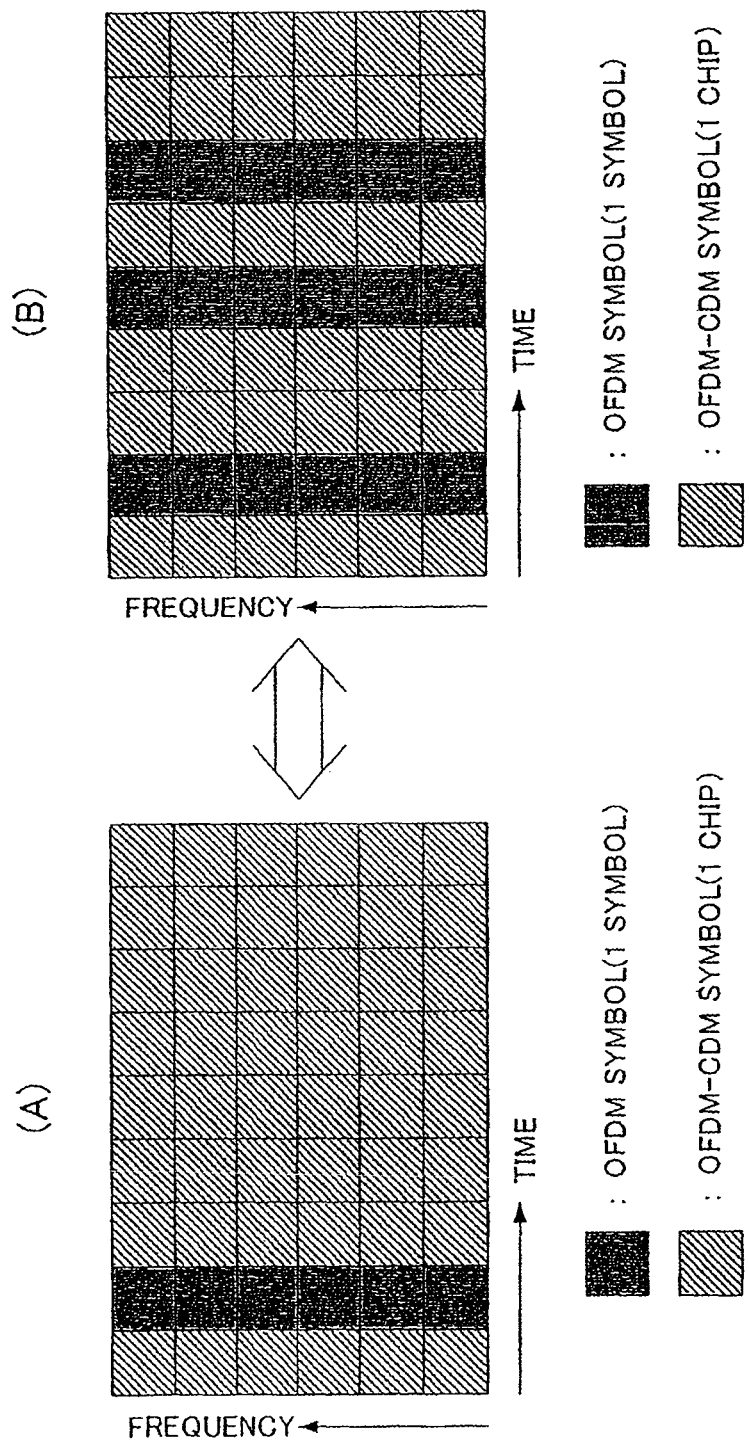
FIG. 10 is a diagram illustrating configuration example of a communications frame according to Embodiment 2 of the present invention.
Figure 11:
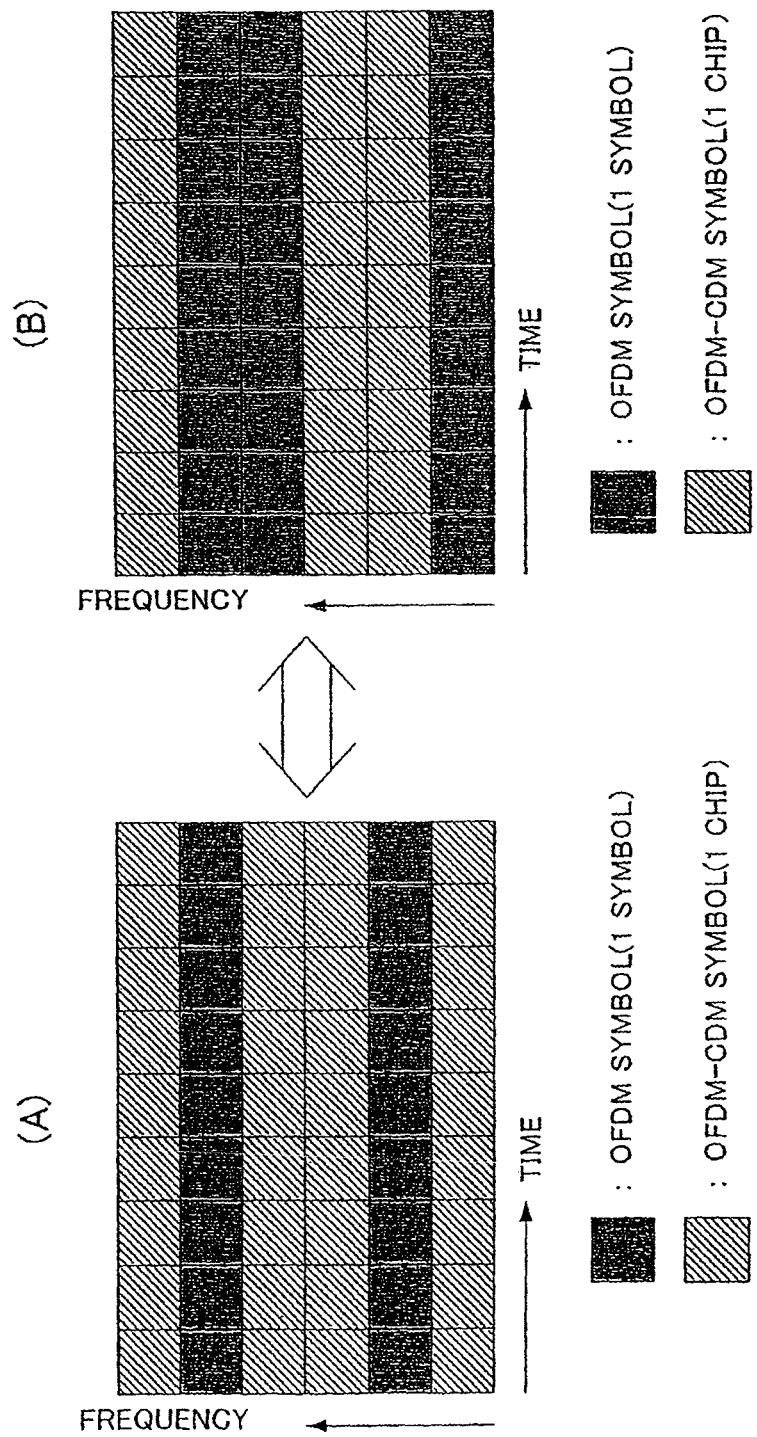
FIG. 11 is a diagram illustrating a configuration example of a communications frame according to Embodiment 2 of the present invention.

More specifically, as illustrated in FIG. 10 and FIG. 11, the percentage of OFDM signals is reduced when the number of communication terminals enjoying good radio propagation conditions is small as illustrated in FIG. 10(A) and FIG. 11(A). Contrarily, in a case where the number of communication terminals enjoying good radio propagation conditions is large, the percentage of OFDM signals is raised as illustrated in FIG. 10(B) and FIG. 11(B).

Not limited to the method for selecting whether OFDM signal transmission is done or OFDM-CDM signal transmission is done depending on radio propagation conditions such as reception electric field intensity, Doppler frequency, disturbance wave intensity, multi-path conditions, delay profile, direction of arrival, polarization conditions, and so forth, it may alternatively be configured in such a way that selection between OFDM signal transmission and OFDM-CDM signal transmission is made in accordance with reception quality.

Further alternatively, in place of radio propagation conditions or reception quality, or in addition to these factors, it may be configured in such a manner that a communication terminal makes selection as to whether OFDM signal transmission or OFDM-CDM signal transmission is done as illustrated in FIG. 10(A), FIG. 10(B), FIG. 11(A), and FIG. 11(B) in accordance with a request transmission rate, request modulation scheme, request transmission quality which the terminal demands.

By this means, according to a wireless communications method of the present embodiment, it is possible to reduce unnecessary data transmission because only signals under modulation schemes matching with radio propagation conditions for each communication terminal or conforming to a request from each communications terminal are transmitted. Consequently, in addition to the effective utilization of limited propagation path resources, it becomes possible to increase the actual data transmission efficiency of a wireless base station apparatus.

Figure 12:
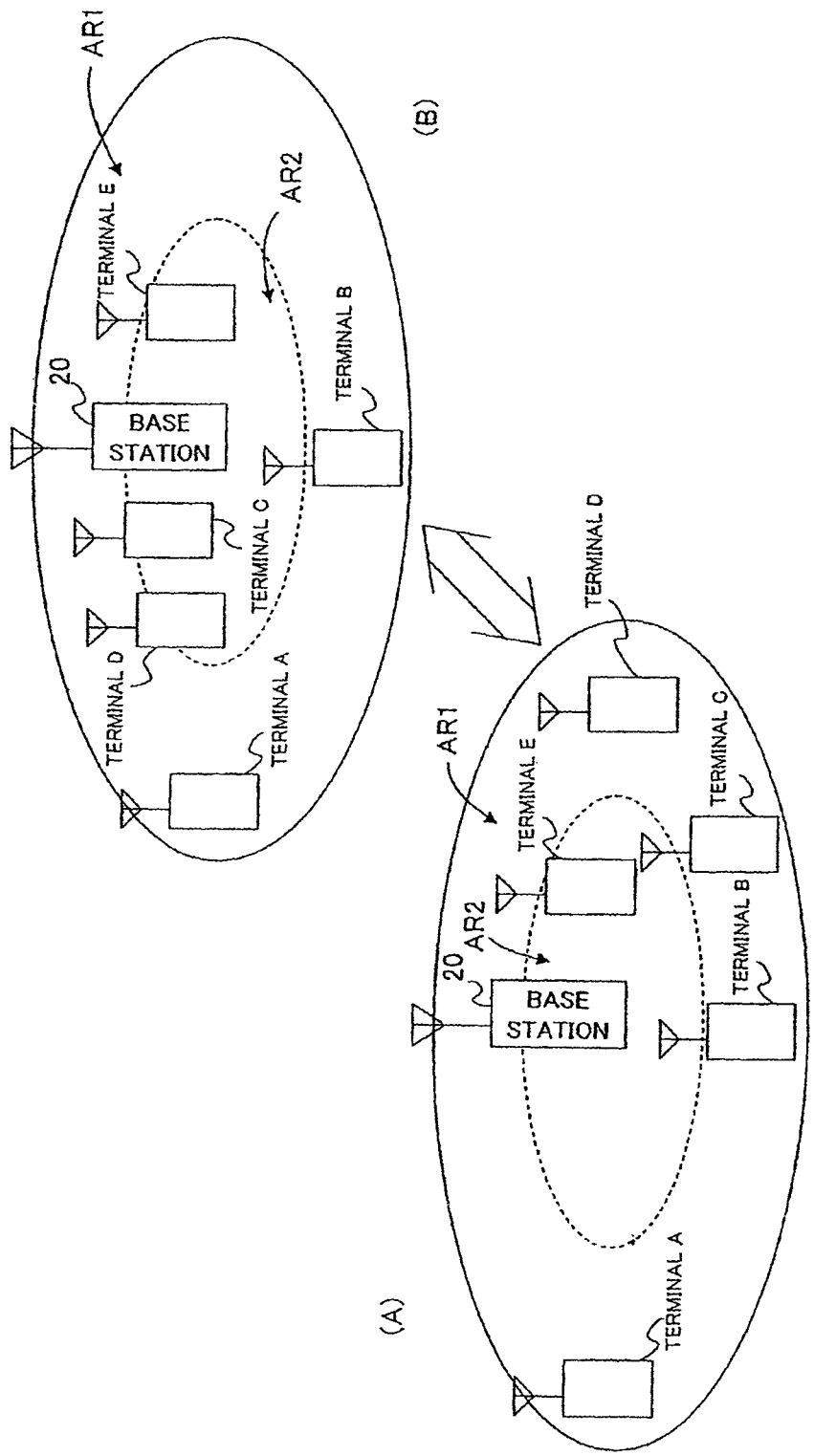
FIG. 12 is a diagram illustrating, in a separate manner, the location of a wireless base station apparatus and the locations of communication terminals, presented to support descriptions of the switching in communications frames according to Embodiment 2.

More specifically, when considering reception quality, in a case where the number of communication terminals which are positioned at relatively long distances from wireless base station apparatus 20 (communication terminals A-D) is larger and the number of communication terminals which are positioned at relatively short distances from wireless base station apparatus 20 (communication terminal E) is smaller as illustrated in FIG. 12(A), the configuration of a communications frame is made as in FIG. 10(A) or FIG. 11(A). Contrarily, in a case where the number of communication terminals which are positioned at relatively short distances from wireless base station apparatus 20 (communication terminals C-E) is larger and the number of communication terminals which are positioned at relatively long distances from wireless base station apparatus 20 (communication terminals A and B) is smaller as illustrated in FIG. 12(B), the configuration of a communications frame is made as in FIG. 10(B) or FIG. 11(B). However, the above description does not always hold when information requested by communications terminals is taken into consideration.

Figure 13:
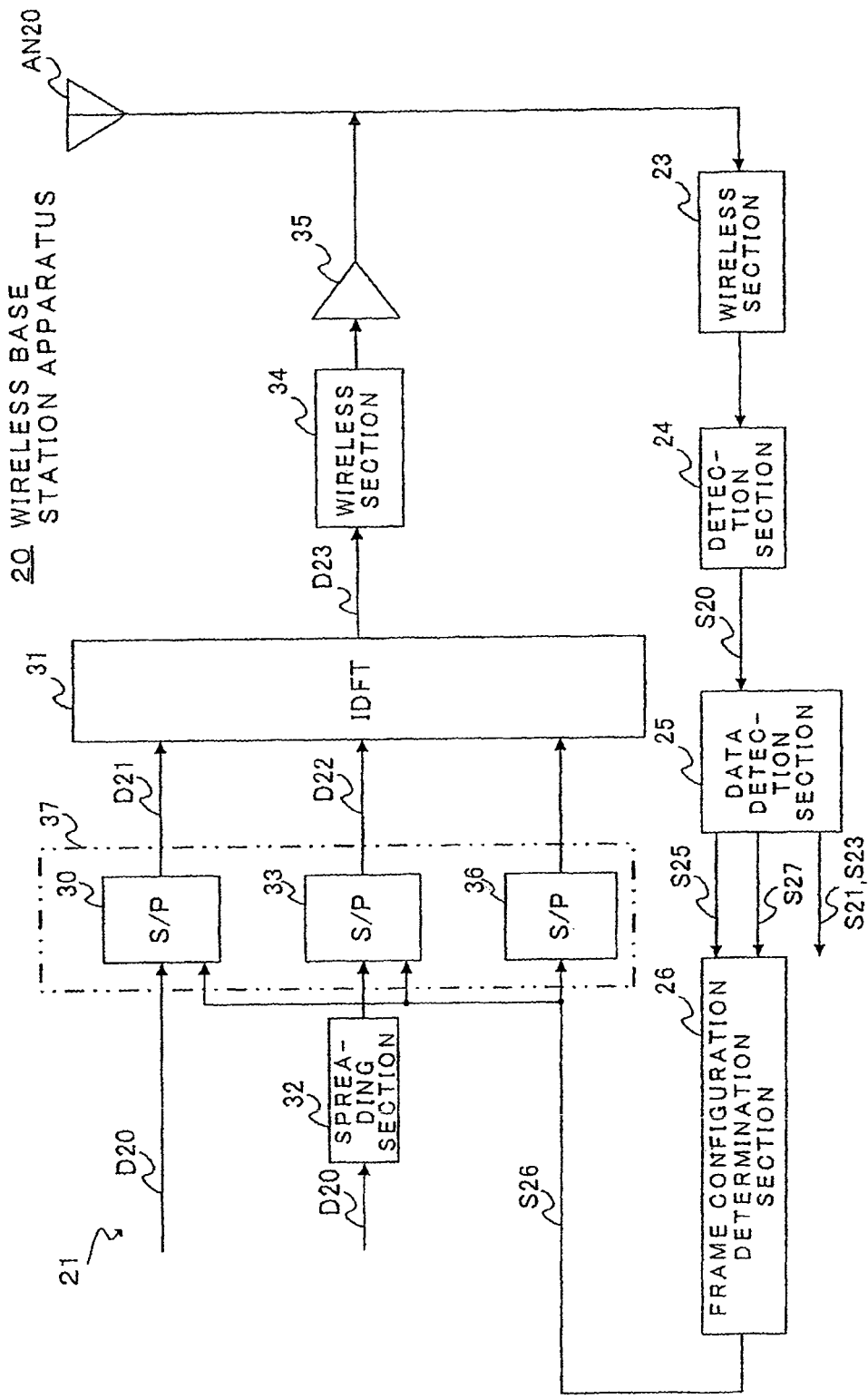
FIG. 13 is a block diagram illustrating the configuration of a wireless base station apparatus according to Embodiment 2 of the present invention.

FIG. 13 illustrates the configuration of wireless base station apparatus 20 according to the present embodiment. In FIG. 13, reference numeral 20 illustrates a wireless base station apparatus as a whole. Wireless base station apparatus 20 accepts the input of a reception signal received by antenna AN 20 at wireless section 23. After performing predetermined radio processing such as down-conversion, analog-to-digital conversion processing, etc. on an inputted signal, wireless section 23 sends out the processed quadrature base-band signal to detection section 24.

Figure 14:
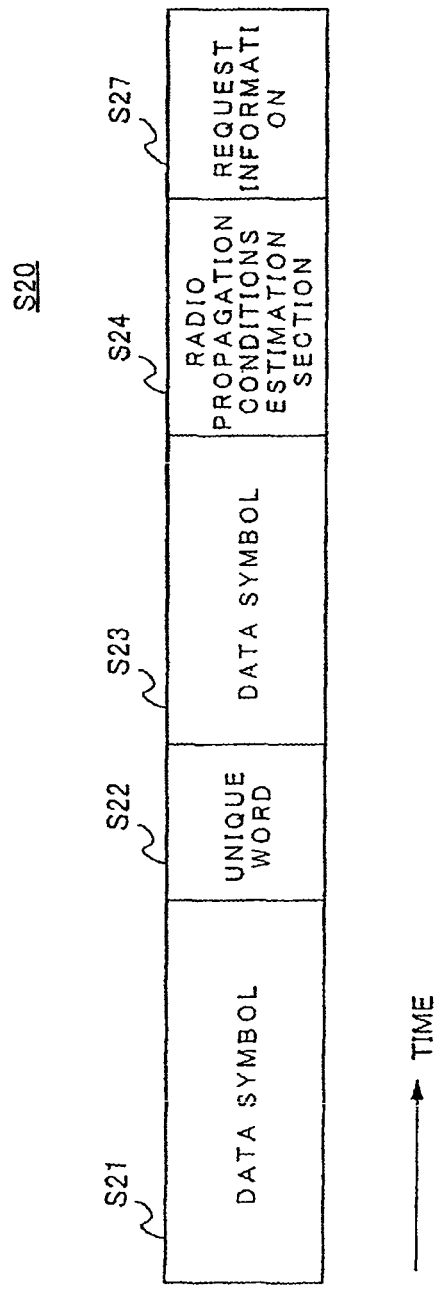
FIG. 14 is a diagram illustrating the configuration of a transmission signal from a communications terminal according to Embodiment 2.

Detection section 24 detects the inputted signal to send out the detected reception signal S20 to data detection section 25. Herein, reception signal S20 after detection takes a format as illustrated in FIG. 14. That is, in addition to data symbols S21 and S23 and unique word S22, radio propagation conditions estimation information S24 and request information S27 is added. This radio propagation conditions estimation information S24 is information on a signal received by a communications terminal such as its multi-path, electric field intensity, Doppler frequency, interference power, disturbance wave intensity, delay profile, direction of wave arrival, polarization conditions, and so forth. Request information S27 is information indicating the request transmission rate, request modulation scheme, request transmission quality, which are requested by each communications terminal.

Data detection section 25 splits reception signals S20 after detection into data symbols S21 and S23, radio propagation conditions estimation information S25, and request information S27, and outputs data symbols S21 and S23 as reception data, and in addition, sends out radio propagation conditions estimation information S25 and request information S27 to frame configuration determination section 26.

Based on radio propagation conditions estimation information S25 and request information S27, frame configuration determination section 26 determines the frame configuration of a transmission signal, and outputs the determination as frame configuration information S26. More specifically, frame configuration determination section 26 makes selection as to whether OFDM signals are transmitted or OFDM-CDM signals are transmitted to each communications terminal based on radio propagation conditions estimation information S25 and request information S27, and then determines a transmission frame as illustrated in FIG. 10 and FIG. 11 in accordance with the selection result. Frame configuration determination section 26 sends out the determined frame configuration information S26 to each serial/parallel (S/P) converting section 30, 33, and 36 in frame configuration section 37.

For example, an OFDM-CDM scheme is selected in a case where radio propagation conditions estimation information S25 indicating the existence of a plurality of delay waves having high electric field intensity (indicating a large effect from the delay waves) is received as the result of measuring a delay profile, whereas an OFDM scheme is selected in a case where radio propagation conditions estimation information S25 indicating the non-existence delay wave shaving high electric field intensity is received.

In addition, an OFDM-CDM scheme is selected in a case where radio propagation conditions estimation information S25 indicating reception polarization conditions which is significantly different from transmission polarization is received as the result of measuring polarization conditions, whereas an OFDM scheme is selected in a case where radio propagation conditions estimation information S25 indicating reception polarization conditions which is approximately the same as transmission polarization is received.

Next, an explanation is given here on the transmission system of wireless base station apparatus 20. Wireless base station apparatus 20 accepts the input of a transmission digital signal D20 at serial/parallel converting section (S/P) 30. In addition, frame configuration information S26 which is determined by frame configuration determination section 26 is inputted into serial/parallel converting section 30. Based on frame configuration information S26, serial/parallel converting section 30 performs serial-to-parallel conversion processing on the inputted transmission digital signal D20, and sends out the parallel signal D21 to Inverse Discrete Fourier Transform (IDFT) section 31.

Transmission digital signal D20 is also inputted into spread section 32. Spread section 32 performs spread processing on the transmission digital signal D20 by means of a predefined spreading code, and sends out the resultant spread signal to serial/parallel converting section (S/P) 33. In addition, frame configuration information S26 is inputted into serial/parallel converting section 33. Based on frame configuration information S26, serial/parallel converting section 33 performs serial-to-parallel conversion processing on the inputted signal, and sends out resultant parallel signal D22 to Inverse Discrete Fourier Transform (IDFT) section 31. In addition, frame configuration information S26 is inputted into Inverse Discrete Fourier Transform section 31 through serial/parallel converting section 36.

Inverse Discrete Fourier Transform section 31 performs inverse discrete Fourier transform processing on the inputted parallel signal D21, OFDM-CDM parallel signal D22, and the frame information signal. Through this processing, transmission signal D23 is formed, in which the frame information signal, OFDM signal, and OFDM-CDM signal are mixed.

Wireless section 34 performs predetermined radio processing such as digital-to-analog conversion, up-conversion, etc. on transmission signal D23, and sends out the processed signal to transmission power amplifying section 35. The signal amplified at transmission power amplification section 35 is sent out to antenna AN 20. In this way, a selection is made between an OFDM signal and an OFDM-CDM signal at wireless base station apparatus 20 depending on radio propagation environment for each communications terminal or in accordance with the terminal's request, and transmission is carried out by arranging OFDM signals and/or OFDM-CDM signals addressed to a plurality of communications terminals in a transmission frame.

Figure 15:
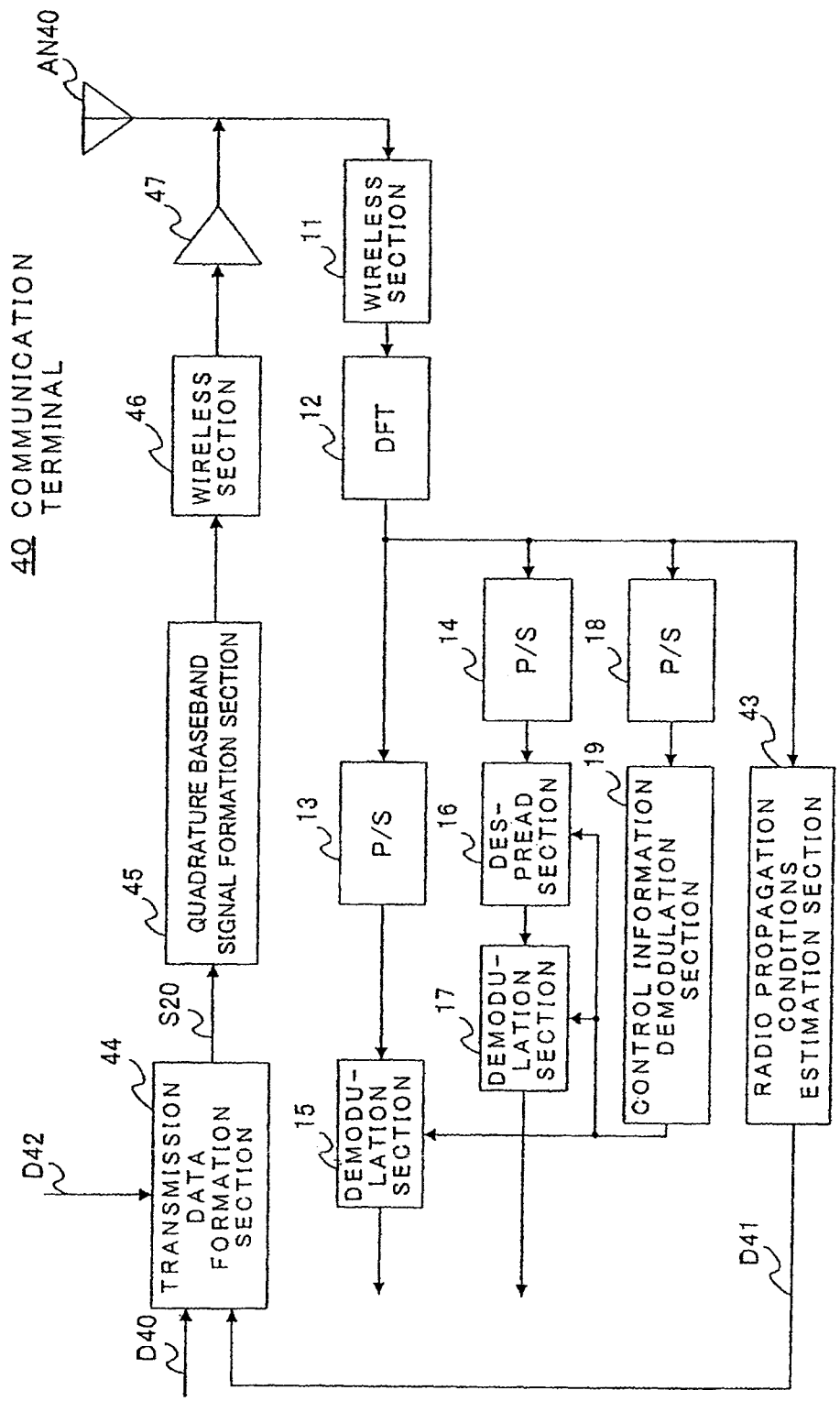
FIG. 15 is a block diagram illustrating the configuration of a communications terminal according to Embodiment 2.

Next, the configuration of a communications terminal which receives mixed signals containing OFDM signals and OFDM-CDM signals sent from wireless base station apparatus 20 is illustrated in FIG. 15. In FIG. 15, parts/components/sections corresponding to those in FIG. 8 described above are denoted with the same reference numerals as those in the corresponding figure. A redundant explanation is omitted for the parts/components/sections denoted with the same reference numerals because their functions are similar to the above corresponding description's.

The reception system of communications terminal 40 is provided with radio propagation conditions estimation section 43. Based on an output from Discrete Fourier Transform section 12, radio propagation conditions estimation section 43 estimates the reception quality of a reception signal as propagation environment by measuring the multi-path, electric field intensity, Doppler frequency, interference power, disturbance wave intensity, delay profile, direction of wave arrival, polarization conditions, etc., of the reception signal, and sends out the estimated radio propagation conditions estimation information D41 to transmission data formation section 44.

Transmission data formation section 44 accepts the input of transmission data D40, radio propagation conditions estimation information D41 estimated by radio propagation conditions estimation section 43, and request information D42. Transmission data formation section 44 forms transmission data S20 in the frame configuration illustrated in FIG. 14, and sends the formed data out to quadrature base-band signal formation section 45. A transmission quadrature base-bind signal formed by quadrature base-band signal formation section 45 is subjected to predetermined radio processing such as digital-to-analog conversion, up-conversion, etc., at wireless section 46, and the radio-processed signal is outputted to the next section, transmission power amplification section 47. The signal amplified at transmission power amplification section 47 is sent out to antenna AN 40.

Herein, request information D42 may be a request transmission rate, request modulation scheme, and request transmission quality, which is demanded by a user of a communications terminal; or alternatively, it may be a required transmission rate, modulation scheme, and transmission quality, which is inevitably determined in accordance with the specific requirements of transmission content such as images, sounds, etc at the time of transmission content determination. In this way, communications terminal 40 transmits information on radio propagation conditions between wireless base station apparatus 20 and the terminal itself and request information to wireless base station apparatus 20.

Thus, according to the above configuration, it is possible to reduce unnecessary data transmission in addition to effects produced in Embodiment 1, which is realized by performing OFDM modulation and OFDM-CDM modulation on transmission data and by transmitting just only signals under modulation schemes matching with radio propagation conditions for each communication terminal or conforming to a request from each communications terminal. Consequently, in addition to the effective utilization of limited propagation path resources, it becomes possible to increase the actual data transmission efficiency of a wireless base station apparatus.

Incidentally, assuming that a communications terminal takes an initiative in switching between an OFDM scheme and an OFDM-CDM scheme, the terminal selects either the OFDM scheme or the OFDM-CDM scheme based on estimated radio propagation environment and request information, and sends request information to a base station. Based on the request information from the terminal, the frame configuration determination section of the base station determines whether to transmit data in an OFDM scheme or in an OFDM-CDM scheme, and outputs frame configuration signal S26.

Contrarily to that, when a base station takes an initiative for switchover, a communications terminal sends estimated radio propagation conditions information and request information to the base station. In accordance with the radio propagation conditions information and the request information from the terminal as well as communications traffic, frame configuration determination section 26 of the base station determines whether to transmit data in an OFDM scheme or in an OFDM-CDM scheme, and outputs frame configuration signal S26.

(Embodiment 3)

In the above-described Embodiment 2, though an explanation is given on a case where a transmission signal to each communications terminal is switched between an OFDM signal and an OFDM-CDM signal in accordance with the reception quality at a communications terminal or a request from the communication terminal, this embodiment proposes some preferred arrangements of OFDM signals and OFDM-CDM signals mixed in a transmission frame when switching these two modulation signals over.

Figure 16:
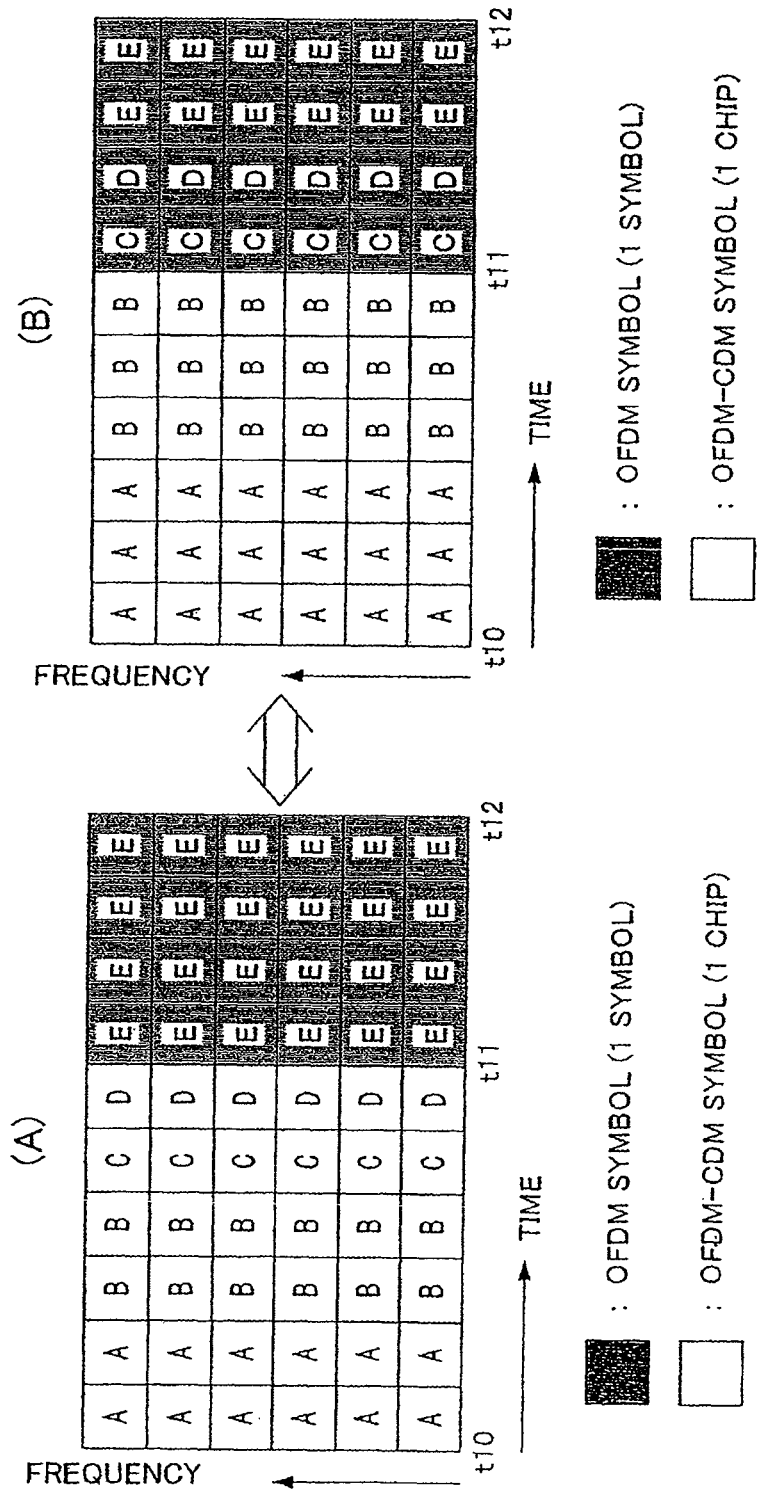
FIG. 16 is a diagram illustrating a configuration example of a communications frame in a case where a time period for OFDM-CDM signal transmission and a time period for OFDM signal transmission are fixed.
Figure 17:
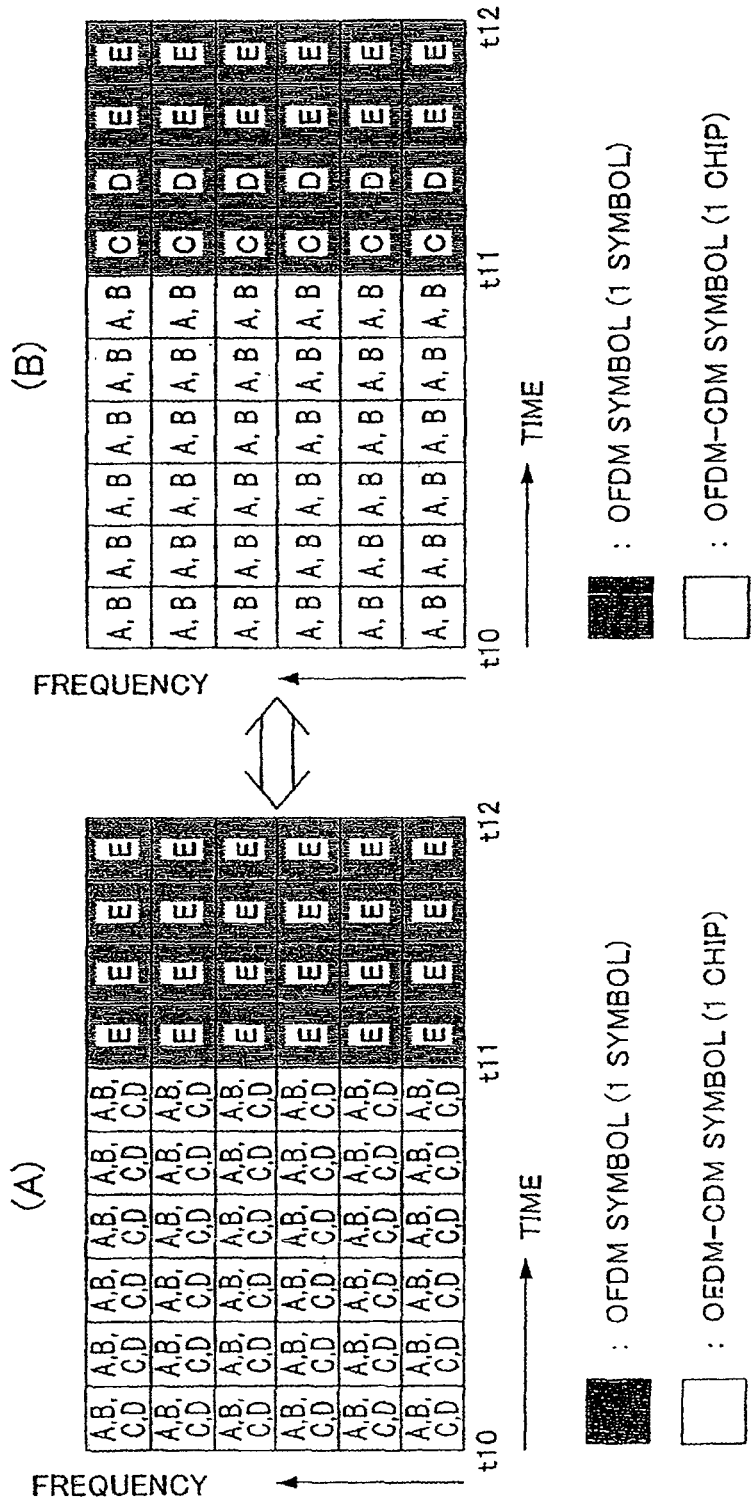
FIG. 17 is a diagram illustrating a configuration example of a communications frame in a case where a time period for OFDM-CDM signal transmission and a time period for OFDM signal transmission are fixed, and where the OFDM-CDM signal is subjected to multi-code multiplexing.

① First, as illustrated in FIG. 16, a method which uses fixed time within a frame, that is, a fixed time t10~t11 for OFDM-CDM signal transmission and a fixed time t11~t12 for OFDM signal transmission is proposed.

Here, FIG. 16 illustrates the frame configuration of one burst of signals transmitted by a base station, where symbols denoted as A, B, C, D, and E represent transmission symbols addressed to terminal A, terminal B, terminal C, terminal D, and terminal E respectively. It is assumed that the layout of OFDM symbols and OFDM-CDM symbols in one burst is fixed. That is, with respect to time-frequency axes, a 4×6 pattern of OFDM symbols and a 6×6 pattern of OFDM-CDM symbols are fixedly laid out in one frame.

Then, as illustrated in FIG. 12(A), in a case where terminal A, terminal B, terminal C, and terminal D are located in an OFDM-CDM reception area encircling base station 20 while terminal E only is located in an OFDM reception area encircling the same, base station 20 transmits each OFDM-CDM signal addressed to terminal A, terminal B, terminal C, or terminal D at each time segment by separating OFDM-CDM signal transmission time t10~t11 into a plurality of time segments as illustrated in FIG. 16(A). Base station 20 transmits an OFDM signal destined for terminal E during OFDM signal transmission time t11~t12.

On the contrary, as illustrated in FIG. 12(B), in a case where terminal A, terminal B are located in an OFDM-CDM reception area encircling base station 20 while terminal C, terminal D, and terminal E are located in an OFDM reception area encircling the same, base station 20 transmits each OFDM-CDM signal addressed to terminal A or terminal B at each time segment by separating OFDM-CDM signal transmission time t10~t11 into a plurality of time segments as illustrated in FIG. 16(B). Base station 20 further transmits an OFDM signal destined for terminal C, terminal D, or terminal E at each time segment by separating OFDM signal transmission time t11~t12 into a plurality of time segments.

As described above, it becomes possible for each reception terminal A~E to demodulate a signal addressed to the reception terminal station itself easily regardless of whether the addressed signal is OFDM-CDM processed one or OFDM processed one, where such easy reception is achieved by fixedly allocating OFDM-CDM signal transmission time t10~t11 and OFDM signal transmission time t11~t12 in one transmission frame so that the reception side is able to separate demodulation processing time for a received frame into an OFDM-CDM demodulation processing time and an OFDM demodulation processing time.

Incidentally, though FIG. 16 illustrates data symbols only, if a control symbol which indicates at which time segment a symbol for each terminal is allocated is placed, for example, at the starting position of a transmission frame, it then becomes possible for a reception terminal receiving the frame to demodulate data destined for the reception station itself easily by referring to such a control symbol. This holds also for FIG. 17~FIG. 23 below.

Here, terminal C is taken as an example. Assuming that terminal C is configured as illustrated in FIG. 15, terminal C performs OFDM-CDM demodulation processing during time t10~t11 in one transmission frame, and performs OFDM demodulation processing during time t11~t12 in the same.

Actually, in a case where a signal addressed to terminal C is one which is OFDM-CDM processed as illustrated in FIG. 16(A), just only the signal addressed to the terminal station itself is demodulated at and outputted from demodulation section 17 after despread section 16. On the contrary, in a case where a signal addressed to terminal C is one which is OFDM processed as illustrated in FIG. 16(B), no signal is outputted through despread section 16 and demodulation section 17, and instead, only the signal addressed to the terminal station itself is demodulated at and outputted from demodulation section 15 after parallel/serial converting section 13. Incidentally, it is possible to recognize at which time segment during OFDM time interval t11~t12 a signal addressed to terminal E is allocated by referring to control information (not shown in FIG.) added at the beginning of the frame. Namely, terminal C is configured in such a manner that control information demodulation section 19 recognizes the allocation position of an OFDM symbol addressed to the terminal station itself and that demodulation section 17 selects the symbol addressed to the terminal station itself to extract the selected symbol.

As described above, the first proposed method allocates OFDM-CDM signal transmission time t10~t11 and OFDM signal transmission time t11~t12 in a fixed manner in one transmission frame so that, when switching is made selectively between an OFDM-CDM signal and an OFDM signal destined for each terminal A~E, each signal is laid out to allow an OFDM-CDM signal or an OFDM signal addressed to each terminal fits within each fixed time segment; this makes processing easier at the time of configuring a transmission frame, and in addition to that, makes demodulation processing easier at the time of demodulating the received transmission frame at a transmission destination station because the transmission destination station is able to separate demodulation processing time for the received frame into an OFDM-CDM demodulation processing time and an OFDM demodulation processing time. Consequently, it is possible to simplify system design.

②FIG. 17 illustrates the second method in which OFDM signals and OFDM-CDM signals are mixed in one transmission frame. According to this method, the same frame configuration is taken as in method ①, except that OFDM-CDM signals are subjected to multi-code multiplexing by using spreading codes varying from one terminal to another in this method. That is, according to this method, OFDM-CDM signal transmission time t10~t11 and OFDM signal transmission time t11~t12 are fixedly allocated, and in addition, OFDM-CDM signals are subjected to multi-code multiplexing to spread chips for each terminal along the directions of the frequency axis and the time axis.

Incidentally, FIG. 17(A) shows a frame format when OFDM-CDM signals are transmitted to terminals A~D, and an OFDM signal is transmitted to terminal E, whereas FIG. 17(B) shows another frame format when OFDM-CDM signals are transmitted to terminals A and B, and OFDM signals are transmitted to terminals C, D, and E.

Likewise the case of ①, the second proposed method allocates OFDM-CDM signal transmission time t10~t11 and OFDM signal transmission time t11~t12 in a fixed manner in one transmission frame so that, when switching is made selectively between an OFDM-CDM signal and an OFDM signal destined for each terminal A~E, each signal is laid out to allow an OFDM-CDM signal or an OFDM signal addressed to each terminal fits within each fixed time segment, which simplifies system design.

Figure 18:
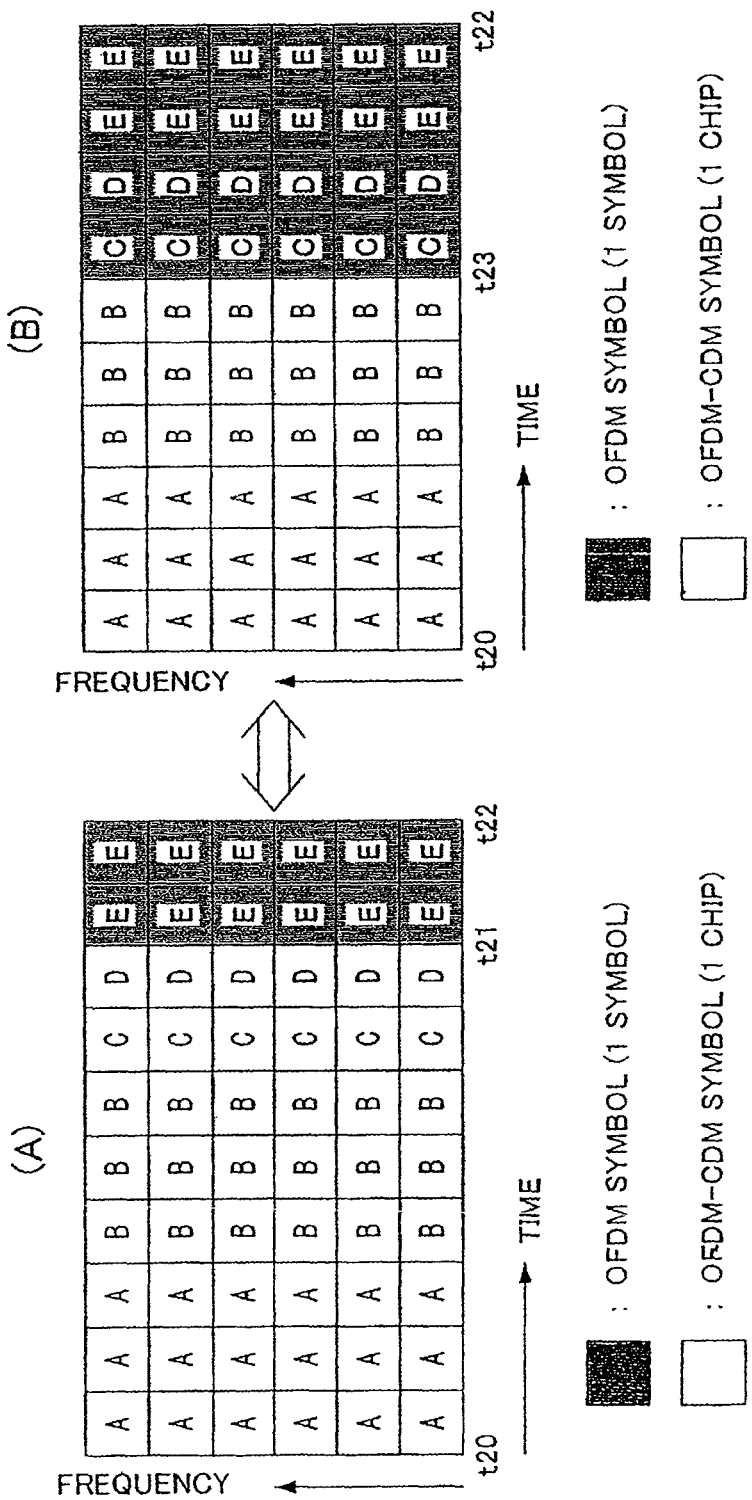
FIG. 18 is a diagram illustrating a configuration example of a communications frame in a case where a time period for OFDM-CDM signal transmission and a time period for OFDM signal transmission are variable in accordance with the number of transmission terminals.

③ FIG. 18 illustrates the third method in which OFDM signals and OFDM-CDM signals are mixed in one transmission frame. This method allocates OFDM-CDM signal transmission time t20~t21, t20~t23 and OFDM signal transmission time t21~t22, t23~t22 in a variable manner in one transmission frame in accordance with the number of terminals to which each modulation signal is transmitted.

For example, in FIG. 18(A), a shorter time t21~t22 is allocated for OFDM signal transmission in one transmission frame because there is only one terminal to which an OFDM signal should be transmitted, that is, terminal E. On the other hand, according to FIG. 18(B), a longer time t23~t22 in comparison with time t21~t22 is allocated for OFDM signal transmission in one transmission frame because there are more terminals to which OFDM signals should be transmitted, that is, terminals C, D, and E.

It is noted that, according to this method, because a certain fixed time is allocated to each of terminals A~E, it becomes possible to achieve fairness in the volume of transmission data allowed to be received by each terminal.

For example, compared with a case in FIG. 16 described in ①, because the method in FIG. 16 allocates time for transmission of OFDM-CDM signals and time for transmission of OFDM signals in a fixed manner regardless of the number of terminals to which OFDM-CDM signals should be transmitted and the number of terminals to which OFDM signals should be transmitted, a situation could occur where a certain terminal(s) is allowed to receive a larger volume of transmission data while other terminal(s) is allowed to receive a smaller volume of transmission data accordingly.

More specifically, in a case where terminal E is only one to which an OFDM signal should be transmitted as illustrated in FIG. 16(A), terminal E is allowed to receive a larger volume of data because it is possible to allocate the entire time of t11~t12 to transmission signals destined for terminal E. In contrast, transmission data per terminal for other terminals A~D is smaller inevitably because it is necessary to transmit data for the 4 terminals within time t10~t11 under such allocation.

As described above, it is possible to achieve fairness of data transmission in terms of the volume of transmission data for each terminal by allocating a fixed time to each terminal while allocating OFDM-CDM signal transmission time t20~t21, t20~t23 and OFDM signal transmission time t21~t22, t23~t22 in a variable manner in one transmission frame.

Figure 19:
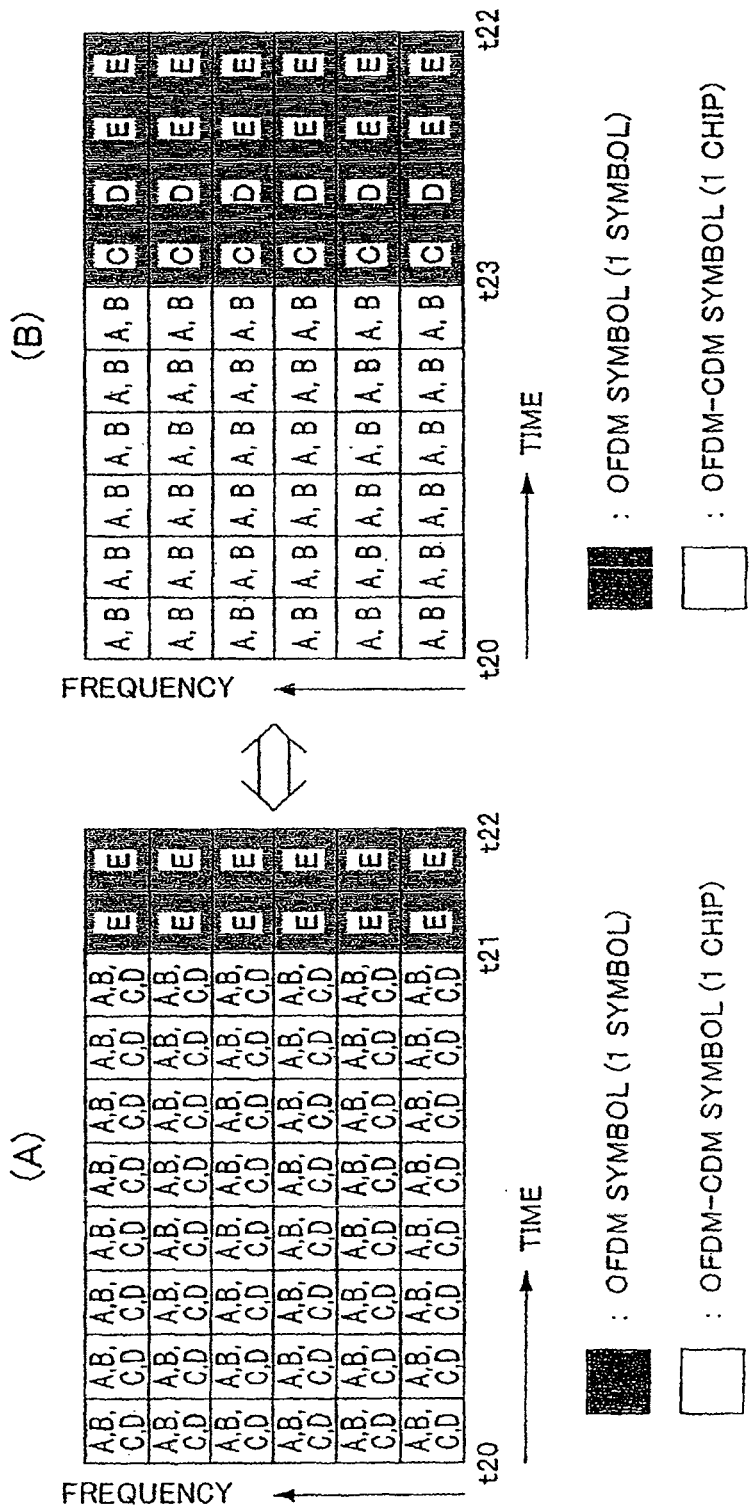
FIG. 19 is a diagram illustrating a configuration example of a communications frame in a case where a time period for OFDM-CDM signal transmission and a time period for OFDM signal transmission are variable in accordance with the number of transmission terminals, and where the OFDM-CDM signal is subjected to multi-code multiplexing.

④ FIG. 19 illustrates the fourth method in which OFDM signals and OFDM-CDM signals are mixed in one transmission frame. According to this method, the same frame configuration is taken as in method ③, except that OFDM-CDM signals are subjected to multi-code multiplexing by using spreading codes varying from one terminal to another in this method. That is, according to this method, a fixed time is allocated to each terminal while OFDM-CDM signal transmission time t20~t21, t20~t23 and OFDM signal transmission time t21~t22, t23~t22 is allocated in a variable manner in one transmission frame in accordance with the number of terminals to which each modulation signal is transmitted, and in addition, OFDM-CDM signals are subjected to multi-code multiplexing to spread chips for each terminal along the directions of the frequency axis and the time axis.

Incidentally, FIG. 19(A) shows a frame format when OFDM-CDM signals are transmitted to terminals A~D, and an OFDM signal is transmitted to terminal E, whereas FIG. 19(B) shows another frame format when OFDM-CDM signals are transmitted to terminals A and B, and OFDM signals are transmitted to terminals C, D, and E.

Likewise the method ③, according to this method, it is possible to achieve fairness of data transmission in terms of the volume of transmission data for each terminal.

Figure 20:
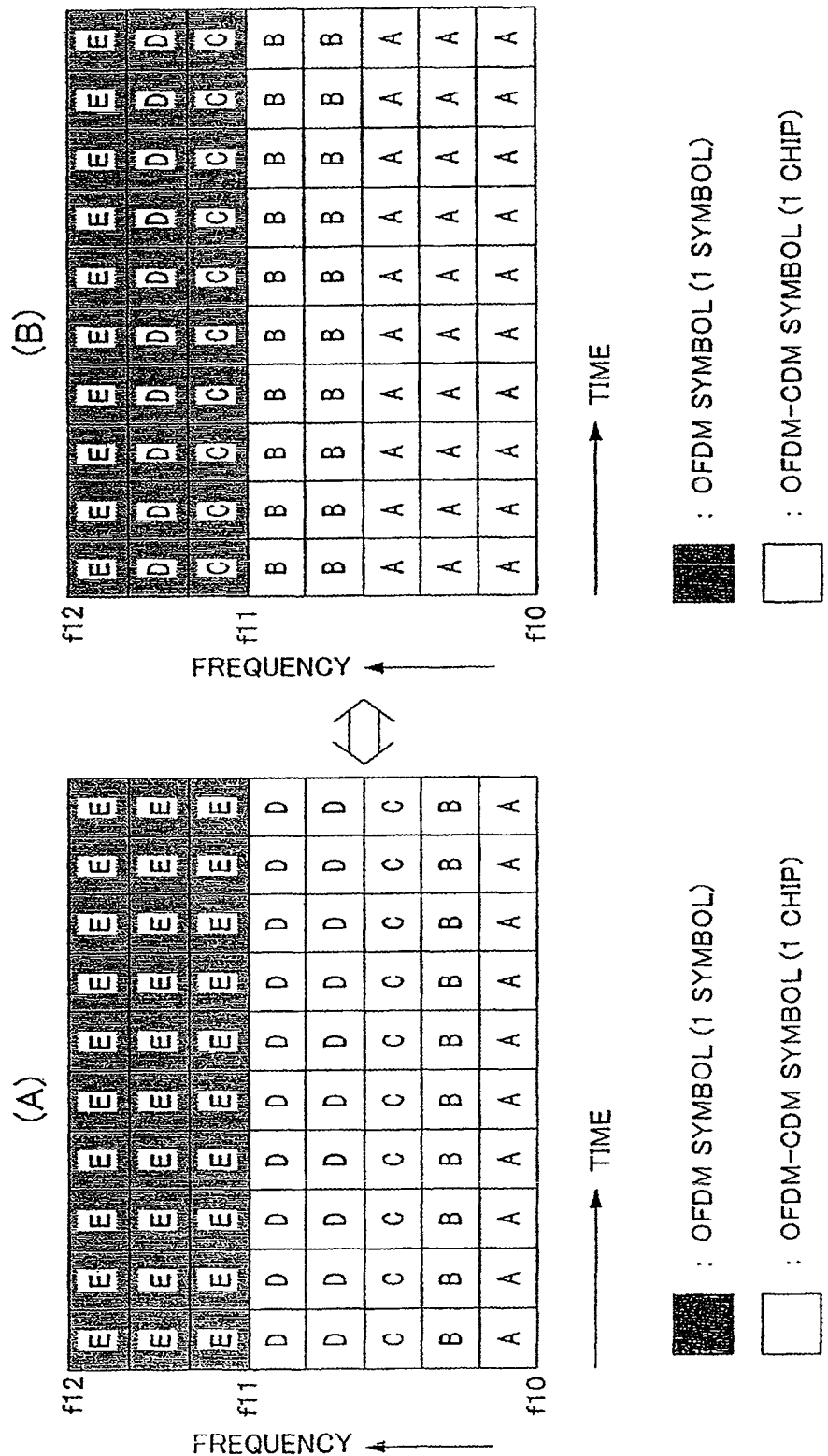
FIG. 20 is a diagram illustrating a configuration example of a communications frame in a case where frequency bands for OFDM-CDM signal transmission and frequency bands for OFDM signal transmission are fixed.

⑤ FIG. 20 illustrates the fifth method in which OFDM signals and OFDM-CDM signals are mixed in one transmission frame. According to this method, sub-carriers for transmission of OFDM-CDM signals and sub-carriers for transmission of OFDM signals are fixedly allocated.

Specifically, as illustrated in FIG. 12(A), in a case where terminal A, terminal B, terminal C, and terminal D are located in an OFDM-CDM reception area encircling base station 20 while terminal E only is located in an OFDM reception area encircling the same, base station 20 transmits OFDM-CDM signals addressed to respective terminals by separating OFDM-CDM signal transmission frequency band f10~f11 into a plurality of sub-carriers and by allocating the divided sub-carriers respectively to terminal A, terminal B, terminal C, and terminal D as illustrated in FIG. 20(A). Base station 20 transmits an OFDM signal destined for terminal E with OFDM signal transmission frequency band f11~f12.

On the contrary, as illustrated in FIG. 12(B), in a case where terminal A, terminal B are located in an OFDM-CDM reception area encircling base station 20 while terminal C, terminal D, and terminal E are located in an OFDM reception area encircling the same, base station 20 transmits each OFDM-CDM signal addressed to terminal A or terminal B with each sub-carrier by separating OFDM-CDM signal transmission frequency f10~f11 into a plurality of sub-carriers and by allocating the divided sub-carriers to OFDM-CDM signals addressed to terminal A, terminal B respectively as illustrated in FIG. 20(B). Base station 20 further transmits OFDM signals destined respectively for terminal C, terminal D, and terminal E with respective divided sub-carriers by separating OFDM signal transmission frequency band f11~f12 into a plurality of sub-carriers and by allocating the divided sub-carriers for OFDM signal transmission to the respective terminals.

As described above, it becomes possible for each reception terminal A~E to demodulate a signal addressed to the reception terminal station itself easily regardless of whether the addressed signal is OFDM-CDM processed one or OFDM processed one, where such easy reception is achieved by fixedly allocating OFDM-CDM signal transmission frequency band f10~f11 and OFDM signal transmission frequency f11~f12 in one transmission frame so that the reception side is able to separate demodulation processing frequency band for a received frame into an OFDM-CDM demodulation processing frequency band and an OFDM demodulation processing frequency band.

That is, on the precondition that OFDM-CDM signal transmission frequency band f10~f11 and OFDM signal transmission frequency band f11~f12 are fixedly allocated in one transmission frame as described above, it is possible to separate reception signals into OFDM-CDM signals and OFDM signals by, for example, splitting signals into frequency band f10~f11 and frequency band f11~f12 at wireless section 11 in FIG. 15. Then, the signals in frequency band f10~f11 go through DFT 12, P/S 14, despread section 16, and demodulation section 17, where the signals are subjected to OFDM-CDM demodulation processing to be outputted as demodulation signals, and in addition, the signals in frequency band f11~f12 go through DFT 12, P/S 13, and demodulation section 15, where the signals are subjected to OFDM demodulation processing to be outputted as demodulation signals.

Figure 21:
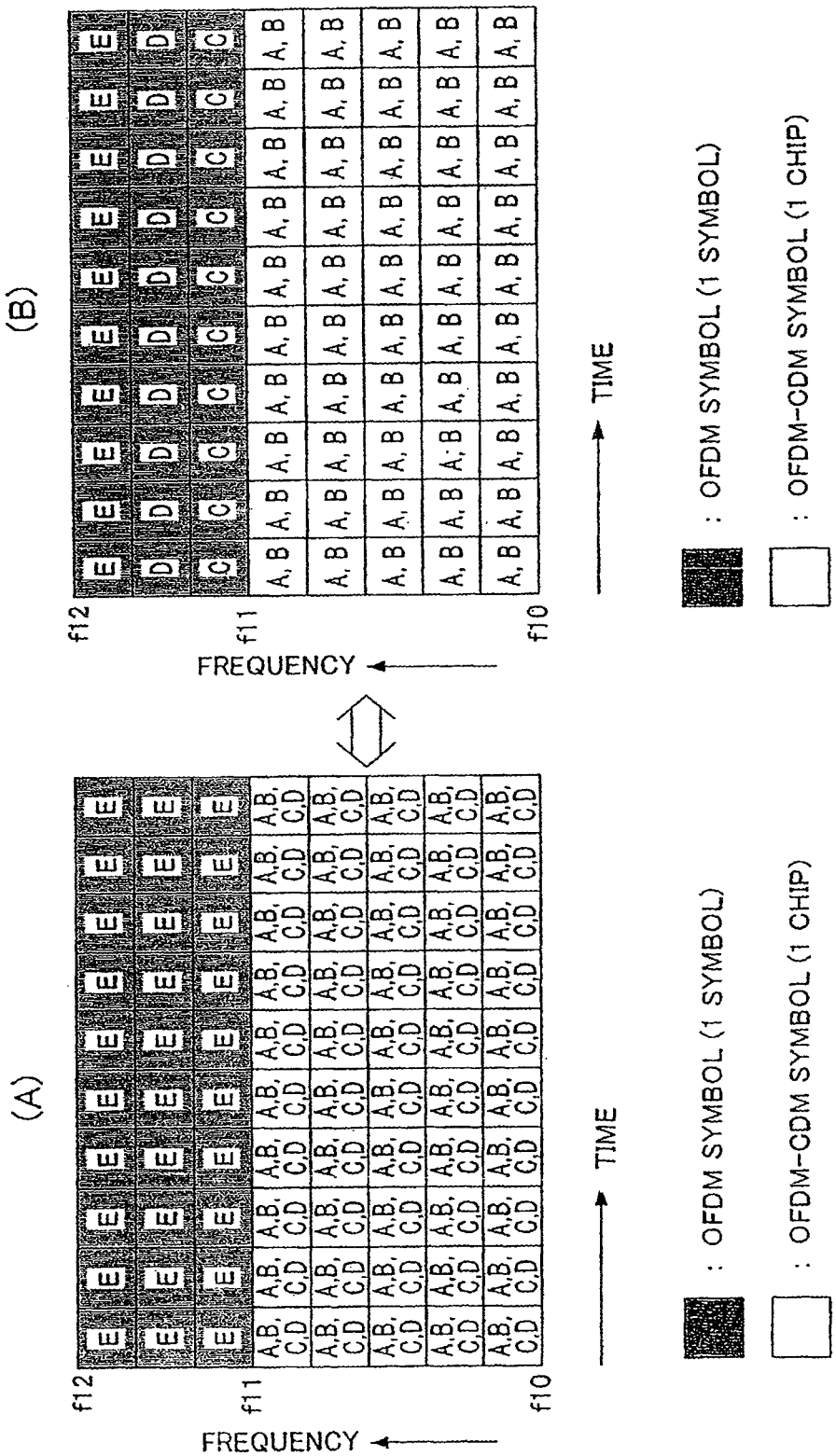
FIG. 21 is a diagram illustrating a configuration example of a communications frame in a case where frequency bands for OFDM-CDM signal transmission and frequency bands for OFDM signal transmission are fixed, and where the OFDM-CDM signal is subjected to multi-code multiplexing.

⑥ FIG. 21 illustrates the sixth method in which OFDM signals and OFDM-CDM signals are mixed in one transmission frame. According to this method, the same frame configuration is taken as in method ⑤, except that OFDM-CDM signals are subjected to multi-code multiplexing by using spreading codes varying from one terminal to another in this method. That is, according to this method, OFDM-CDM signal transmission frequency band f10~f11 and OFDM signal transmission frequency band f11~f12 are fixedly allocated, and in addition, OFDM-CDM signals are subjected to multi-code multiplexing to spread chips for each terminal along the directions of the frequency axis and the time axis.

Incidentally, FIG. 21(A) shows a frame format when OFDM-CDM signals are transmitted to terminals A~D, and an OFDM signal is transmitted to terminal E, whereas FIG. 21(B) shows another frame format when OFDM-CDM signals are transmitted to terminals A and B, and OFDM signals are transmitted to terminals C, D, and E.

Likewise the case of ⑤, the sixth proposed method allocates OFDM-CDM signal transmission frequency band f10~f11 and OFDM signal transmission frequency band f11~f12 in a fixed manner in one transmission frame so that, when switching is made selectively between an OFDM-CDM signal and an OFDM signal destined for each terminal A~E, each signal is laid out to allow an OFDM-CDM signal or an OFDM signal addressed to each terminal fits within each fixed frequency band, which simplifies system design.

Figure 22:
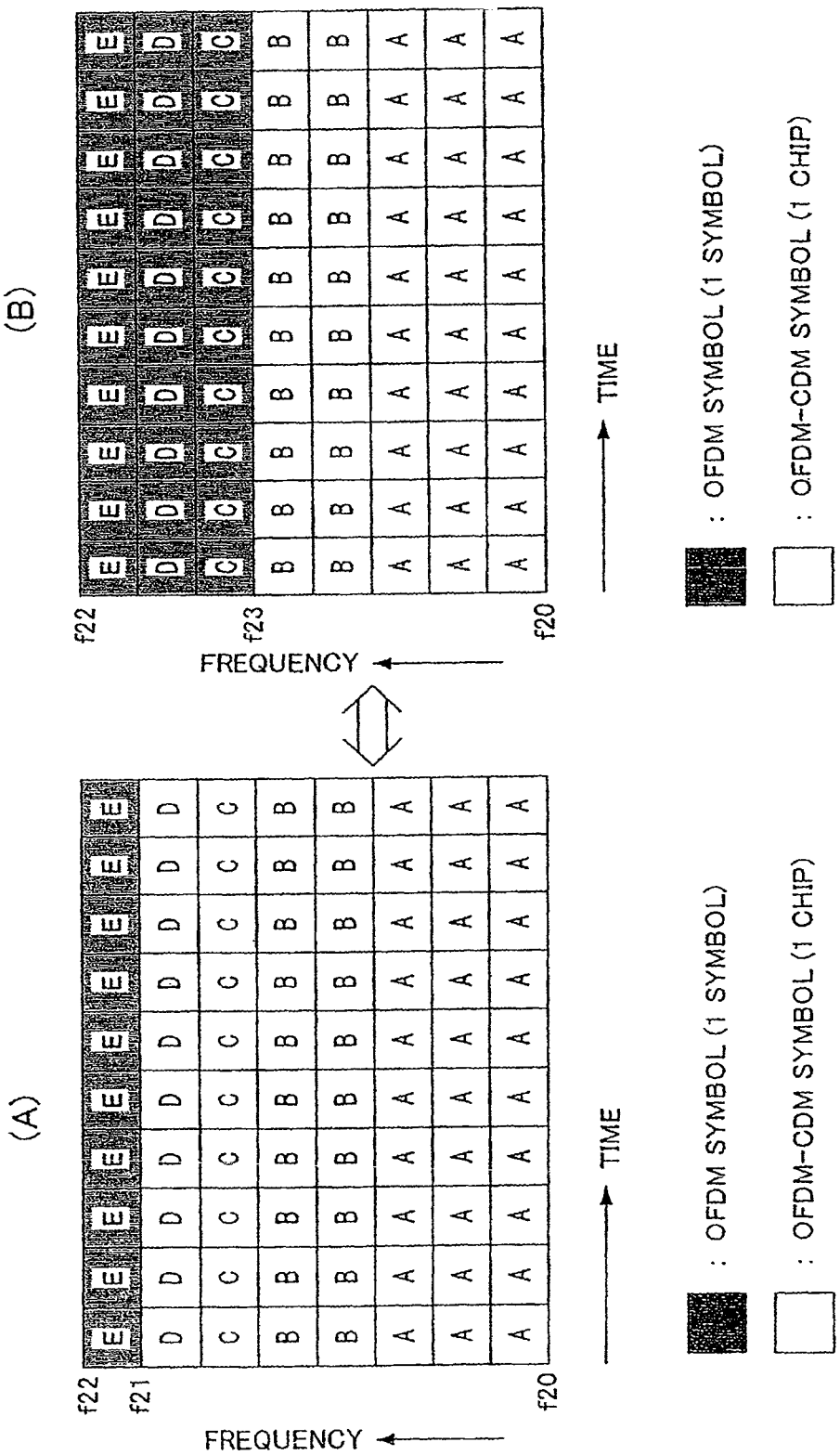
FIG. 22 is a diagram illustrating a configuration example of a communications frame in a case where frequency bands for OFDM-CDM signal transmission and frequency bands for OFDM signal transmission are variable in accordance with the number of transmission terminals.

⑦ FIG. 22 illustrates the seventh method in which OFDM signals and OFDM-CDM signals are mixed in one transmission frame. This method allocates OFDM-CDM signal transmission frequency band f20~f21, f20~f23 and OFDM signal transmission frequency band f21~f22, f23~f22 in a variable manner in one transmission frame in accordance with the number of terminals to which each modulation signal is transmitted.

For example, in FIG. 22(A), a narrower frequency band f21~f22 is allocated for OFDM signal transmission in one transmission frame because there is only one terminal to which an OFDM signal should be transmitted, that is, terminal E. On the other hand, according to FIG. 22(B), a wider frequency band f23~f22 in comparison with frequency band f21~f22 is allocated for OFDM signal transmission in one transmission frame because there are more terminals to which OFDM signals should be transmitted, that is, terminals C, D, and E.

It is noted that, according to this method, because a certain fixed frequency band (sub-carrier) is allocated to each of terminals A~E, it becomes possible to achieve fairness in the volume of transmission data allowed to be received by each terminal.

For example, compared with a case in FIG. 20 described in ⑤, because the method in FIG. 20 allocates frequency band for transmission of OFDM-CDM signals and frequency band for transmission of OFDM signals in a fixed manner regardless of the number of terminals to which OFDM-CDM signals should be transmitted and the number of terminals to which OFDM signals should be transmitted, a situation could occur where a certain terminal(s) is allowed to receive a larger volume of transmission data while other terminal(s) is allowed to receive a smaller volume of transmission data accordingly.

As described above, it is possible to achieve fairness of data transmission in terms of the volume of transmission data for each terminal by allocating a fixed frequency band (sub-carrier) to each terminal while allocating OFDM-CDM signal transmission frequency band f20~f21, f20~f23 and OFDM signal transmission frequency band f21~f22, f23~f22 in a variable manner in one transmission frame.

Figure 23:
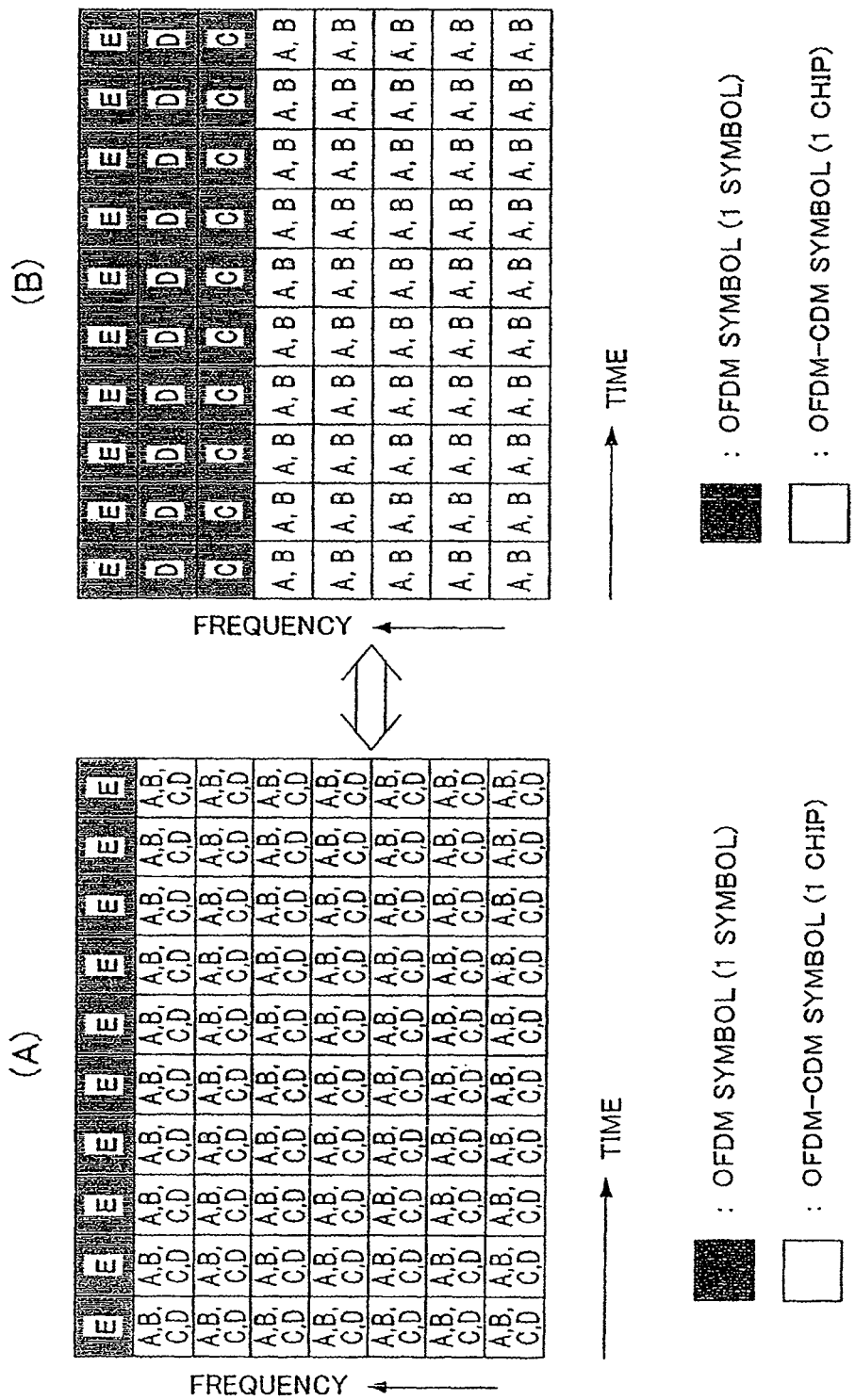
FIG. 23 is a diagram illustrating a configuration example of a communications frame in a case where frequency bands for OFDM-CDM signal transmission and frequency bands for OFDM signal transmission are variable in accordance with the number of transmission terminals, and where the OFDM-CDM signal is subjected to multi-code multiplexing.

⑧ FIG. 23 illustrates the eighth method in which OFDM signals and OFDM-CDM signals are mixed in one transmission frame. According to this method, the same frame configuration is taken as in method ⑦, except that OFDM-CDM signals are subjected to multi-code multiplexing by using spreading codes varying from one terminal to another in this method. That is, according to this method, a fixed frequency band is allocated to each terminal while OFDM-CDM signal transmission frequency band f20~f21, f20~f23 and OFDM signal transmission frequency band f21~f22, f23~f22 is allocated in a variable manner in one transmission frame in accordance with the number of terminals to which each modulation signal is transmitted, and in addition, OFDM-CDM signals are subjected to multi-code multiplexing to spread chips for each terminal along the directions of the frequency axis and the time axis.

Incidentally, FIG. 23(A) shows a frame format when OFDM-CDM signals are transmitted to terminals A~D, and an OFDM signal is transmitted to terminal E, whereas FIG. 23(B) shows another frame format when OFDM-CDM signals are transmitted to terminals A and B, and OFDM signals are transmitted to terminals C, D, and E.

Likewise the method ⑦, according to this method, it is possible to achieve fairness of data transmission in terms of the volume of transmission data for each terminal.

(Embodiment 4)

This embodiment proposes a method for mitigating adverse effects on a reception terminal in a situation where base stations adjacent to each other transmit mixed signals of OFDM-CDM signals and OFDM signals.

Figure 24:
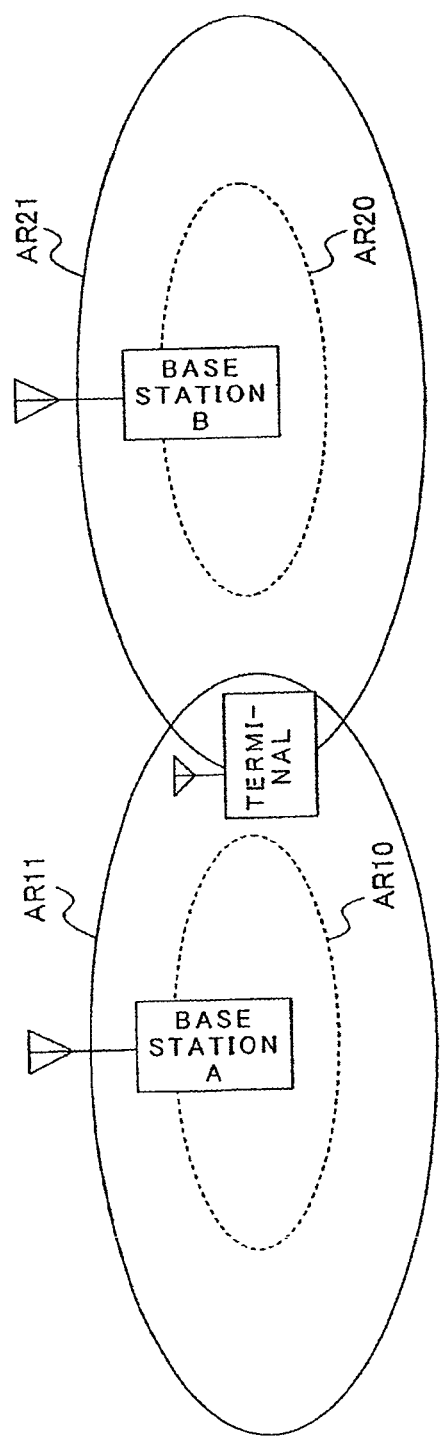
FIG. 24 is a diagram illustrating a limit for the communications range of OFDM signals, a limit for the communications range of OFDM-CDM signals, and the location of a communications terminal according to Embodiment 4.

A system configuration as shown in FIG. 24 is assumed here. In FIG. 24, a limit for the communications range of OFDM-CDM signals sent from base station A is shown as AR 11, while a limit for the communications range of OFDM signals sent from the same is shown as AR 10. In addition, a limit for the communications range of OFDM-CDM signals from base station B is shown as AR 21, while a limit for the communications range of OFDM signals from the same is shown as AR 20.

Here, in comparison with OFDM signals, OFDM-CDM signals are addressed to terminals located at relatively greater distances away from the base station; therefore, it is possible to conceive that the transmission signal level of OFDM-CDM signals might better be set larger than that of OFDM signals in order to enhance their reception quality at OFDM-CDM reception terminals. However, if the transmission level of OFDM-CDM signals are made greater, there is an adverse possibility that the greater level will interfere with OFDM signals in other adjacent cells to cause degradation in their reception quality in the OFDM communications area.

Figure 25:
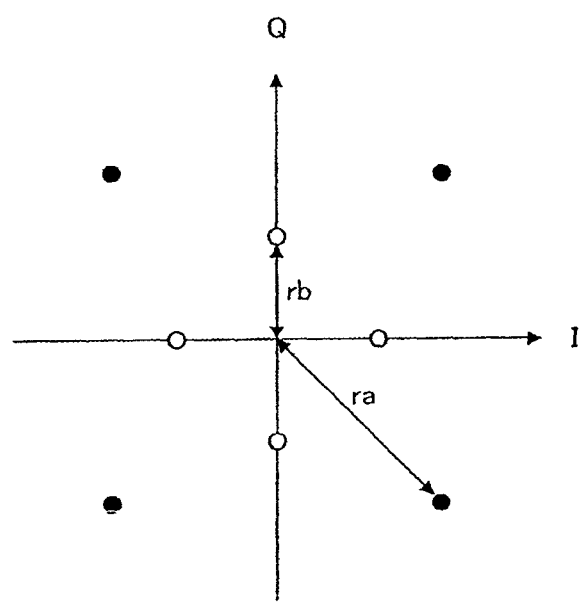
FIG. 25 is a diagram illustrating the signal point constellation of an OFDM signal, and the signal point constellation of an OFDM-CDM signal according to Embodiment 4.

Therefore, in this embodiment, as illustrated in FIG. 25, the signal point layout is devised in such a configuration that the distance ra which is from an OFDM-CDM processing signal point denoted as a filled circle • to the origin point on the I-Q plane is set longer than the distance rb which is from an OFDM processing signal point denoted as an open circle ○ to the origin point on the I-Q plane, and in addition, the phase of the OFDM-CDM processing signal point • and the phase of the OFDM processing signal point ○ are shifted from each other. It is noted that, though FIG. 25 illustrates a signal point layout for QPSK modulation, the present invention is not limited to QPSK modulation but also applicable to other modulation schemes similarly.

By this means, the greater signal level of OFDM-CDM signals makes it possible to reduce degradation in the reception quality of OFDM signals in other adjacent cell due to interference from the OFDM-CDM signals, in addition to enhancing the reception quality of the OFDM-CDM signals.

Figure 26:
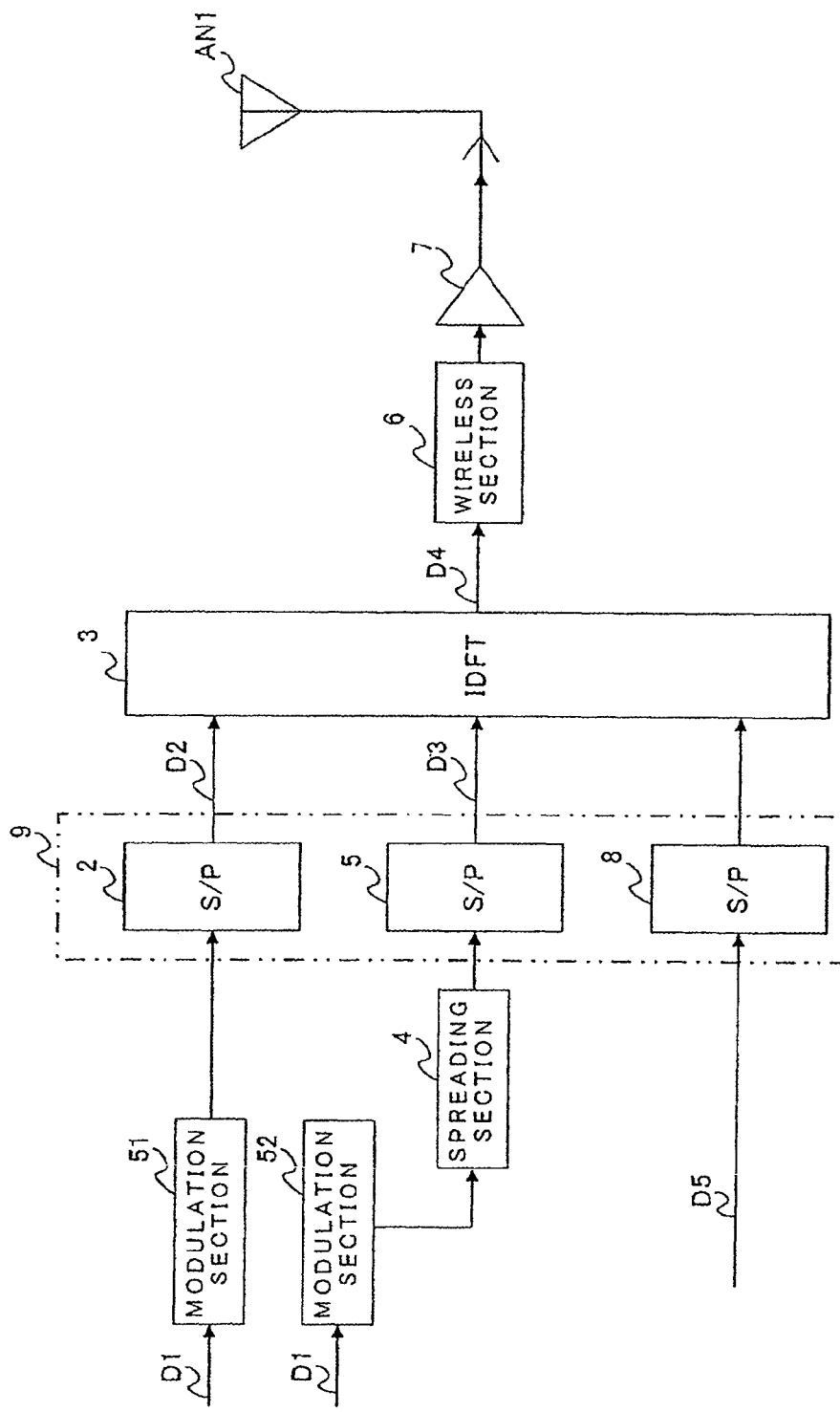
FIG. 26 is a block diagram illustrating the configuration of a wireless base station apparatus according to Embodiment 4.

The configuration of a base station which forms transmission signals as described above is illustrated in FIG. 26. In FIG. 26 where the same reference numerals as in FIG. 7 are used for parts/sections/components corresponding to those shown in said corresponding figure, wireless base station apparatus 50 is configured to perform separate modulation processing at modulation section 51 where modulation signals for OFDM processing are formed and at modulation section 52 where modulation signals for OFDM-CDM processing are formed. That is, modulation section 52 performs modulation processing in such a way that the signal level of symbols after modulation thereat becomes larger than the level at modulation section 51, and in addition, the phase of symbols after modulation thereat becomes shifted from the phase at modulation section 51. Specifically, it is possible to implement such modulation processing easily by staggering mapping positions of signal points.

Under a configuration as described above, as shown in FIG. 24, it is assumed here that a terminal is located at a place outside the area limit for OFDM communications from base station A, AR 10, but inside the area limit for OFDM-CDM communications from base station A, AR 11, and thus receives OFDM-CDM signals from base station A. Under such a situation, the terminal hardly suffers from interference caused by other OFDM-CDM signals transmitted from base station B to other terminal station thanks to the mismatch in spreading codes, nor is the terminal affected so severely by interference from OFDM signals addressed to other terminal station thanks to the mismatch in signal point positions. Consequently, it is possible to gain OFDM-CDM demodulation signals with a good quality.

Assuming another case where a terminal is located at a place inside the area limit for OFDM communications from base station A, AR 10, thus receiving OFDM signals from base station A, then, the terminal hardly suffers from interference from OFDM-CDM signals transmitted from base station B to other terminal station thanks to the mismatch in signal point positions. Consequently, it is possible to gain OFDM demodulation signals with a good quality.

It is noted that, though the above description assumes that the signal level of OFDM-CDM signals is set greater than the signal level of OFDM signals, it is possible to achieve the same effect as that even when the signal level of OFDM signals is set greater than the signal level of OFDM-CDM signals, contrarily to the above description.

Alternatively, it is also effective to adopt a configuration in which a selection is made as to which signal level should be made greater depending on whether a terminal in question is located at a place inside the area limit for OFDM signal communications AR 10 or at the area for OFDM-CDM signal communications AR 11. For example, in a situation where the terminal is located inside OFDM communications area limit AR 10, it is possible to receive OFDM signals addressed to the terminal station itself with a sufficient reception level and also to make the reception less susceptible to adverse effects from OFDM-CDM signals sent from base station B by making the transmission level of the OFDM signals larger than the transmission level of OFDM-CDM signals.

On the other hand, when the terminal is located at OFDM-CDM communications area AR 11, it is possible to receive OFDM-CDM signals addressed to the terminal station itself with a sufficient reception level and also to make the reception less susceptible to adverse effects from OFDM signals sent from base station B by making the transmission level of the OFDM-CDM signals larger than the transmission level of OFDM signals.

As described above, the mismatched layout between the signal points of OFDM-CDM signals and the signal points of OFDM signals makes it possible to reduce interference caused by different modulation signals from other adjacent cell (that is, OFDM-CDM signals from other cell when signals addressed to the terminal station are OFDM signals, or OFDM signals from other cell when signals addressed to the terminal station are OFDM-CDM signals), which makes it further possible to gain demodulation signals with a good quality.

Thus, according to the above configuration, it is possible to mitigate interference caused by signals transmitted from other station in a situation where OFDM signals and OFDM-CDMA are transmitted in a mixed manner by placing the signal point positions of the OFDM signals not matching with the signal point positions of the OFDM-CDM signals; accordingly, in addition to effects produced by Embodiment 1 and Embodiment 2, it is possible to further enhance reception quality.

(Embodiment 5)

First, an explanation is given here on the principle of this embodiment. Though the communications area for a high frequency radio wave is relatively limited due to its large attenuation, such a radio wave is suitable for high-speed data communications thanks to the wide availability of a frequency bandwidth. On the other hand, though a low frequency radio wave is inferior to a high frequency counterpart in terms of high-speed data communications due to the narrow availability of a frequency bandwidth, such a radio wave offers wider communications area thanks to its small attenuation.

Focusing on this point, this embodiment proposes that communications with terminals located in a communications area closer to a base station should be conducted by using a high frequency radio wave and communications with terminals located in a communications area farther from the base station should be conducted by using a low frequency radio wave. This makes it possible to achieve high-speed data communications with a reliable communications quality at the communications area closer to the base station, and to conduct communications with mitigated degradation in quality at the communications area farther from the base station. Consequently, it is possible to realize both high-speed communications and high-quality communications in a compatible manner.

Figure 27:
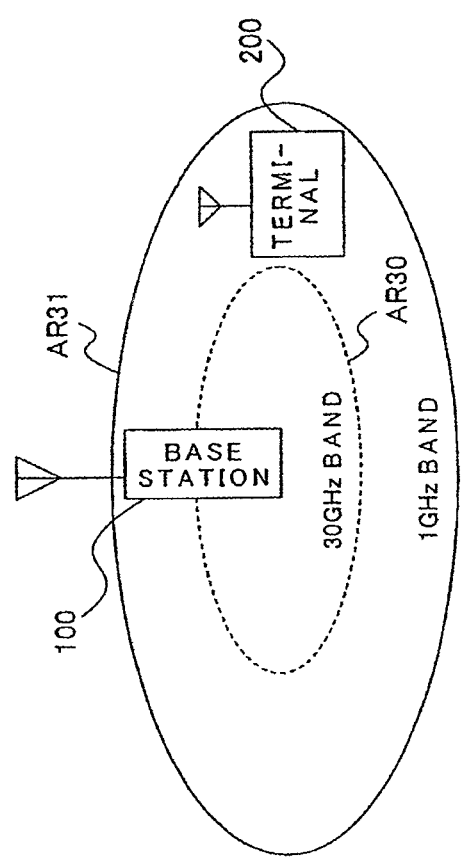
FIG. 27 is a diagram illustrating the relation between a limit for the communication range of radio wave in 1 GHz band and a limit for the communication range of radio wave in 30 GHz band.

FIG. 27 illustrates one example of the positional relationships between base station 100 and terminal 200 in this embodiment, where AR 31 denotes a communications area limit for a transmission signal sent in 1 GHz frequency band from base station 100 whereas AR 30 denotes a communications area limit for a transmission signal sent in 30 GHz frequency band from base station 100. In this embodiment, it is assumed that communications is conducted in the 30 GHz frequency band in a case where terminal 200 is located inside communications area limit AR 30, whereas it is assumed that communications is conducted in the 1 GHz frequency band in a case where terminal 200 is located outside communications area limit AR 30 but inside communications area limit AR 31.

It is further assumed in this embodiment that terminal 200 estimates radio propagation conditions based on a signal received from base station 100, and base station 100 determines in which frequency band base station 100 should send a transmission signal to terminal 200 based on radio propagation conditions information which base station 100 receives from terminal 200. It is noted that the above determination on which frequency band should be used for signal transmission does not necessarily have to be made based on radio propagation conditions estimated by terminal 200; for example, alternatively, it may be determined based on radio propagation conditions estimated by base station 100, or it may be determined based on other request from terminal 200 (e.g. requested transmission rate, requested modulation scheme, requested transmission quality, etc.), or further alternatively, it may be determined simply based on information on distance from base station 100.

Figure 28:
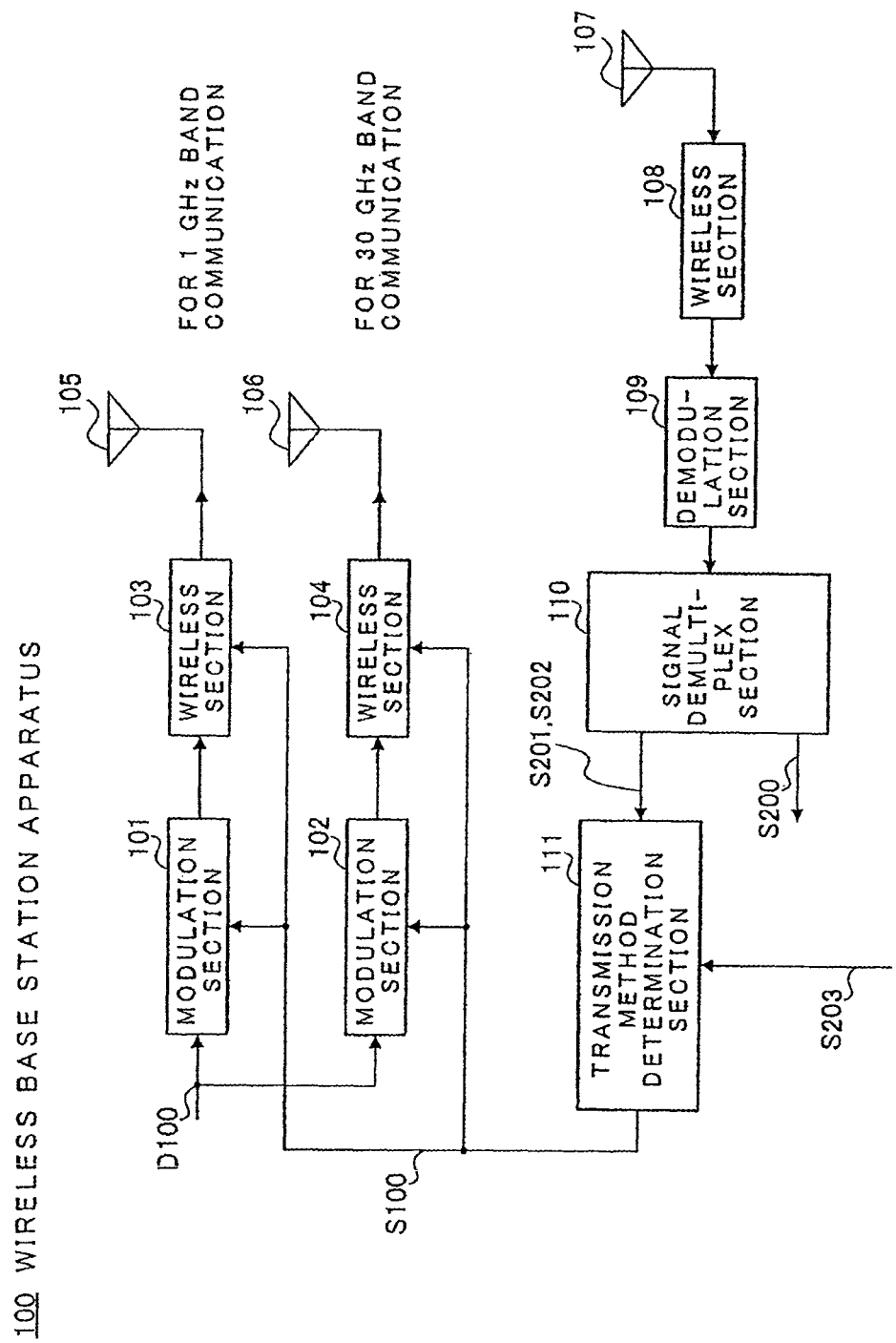
FIG. 28 is a block diagram illustrating the configuration of a wireless base station apparatus according to Embodiment 5.

FIG. 28 illustrates the configuration of wireless base station apparatus 100 according to the present embodiment. First, an explanation is given on transmission system. Wireless base station apparatus 100 accepts the input of a transmission digital signal D100 at modulation section 101 and at modulation section 102. In addition, control information S100 which is determined by transmission method determination section 111 is inputted into modulation section 101 and modulation section 102. When the control signal S100 indicates 1 GHz communications, modulation section 101 modulates the transmission digital signal to output a transmission quadrature base-band signal for 1 GHz communications. When the control signal S100 indicates 30 GHz communications, modulation section 102 modulates the transmission digital signal to output a transmission quadrature base-band signal for 30 GHz communications.

The transmission quadrature base-band signals for 1 GHz communications and for 30 GHz communications are inputted into wireless sections 103 and 104 respectively, and in addition, the control signal S100 is also inputted therein. When the control signal S100 indicates 1 GHz band communications, wireless section 103 up-converts the transmission quadrature base-band signal for 1 GHz communications into a signal in 1 GHz band radio frequency. When the control signal S100 indicates 30 GHz band communications, wireless section 104 up-converts the transmission quadrature base-band signal for 30 GHz communications into a signal in 30 GHz band radio frequency.

By this means, transmission digital signal D100 is outputted from antenna 105 as a transmission signal in 1 GHz band in a case where the control signal S100 indicates 1 GHz band communications, whereas transmission digital signal D100 is outputted from antenna 106 as a transmission signal in 30 GHz band in a case where the control signal S100 indicates 30 GHz band communications. Incidentally, in this embodiment, it is assumed that a transmission signal in 5 MHz bandwidth with a center frequency of 1 GHz is outputted from antenna 105, while a transmission signal in 100 MHz bandwidth with a center frequency of 30 GHz is outputted from antenna 106.

Figure 29:
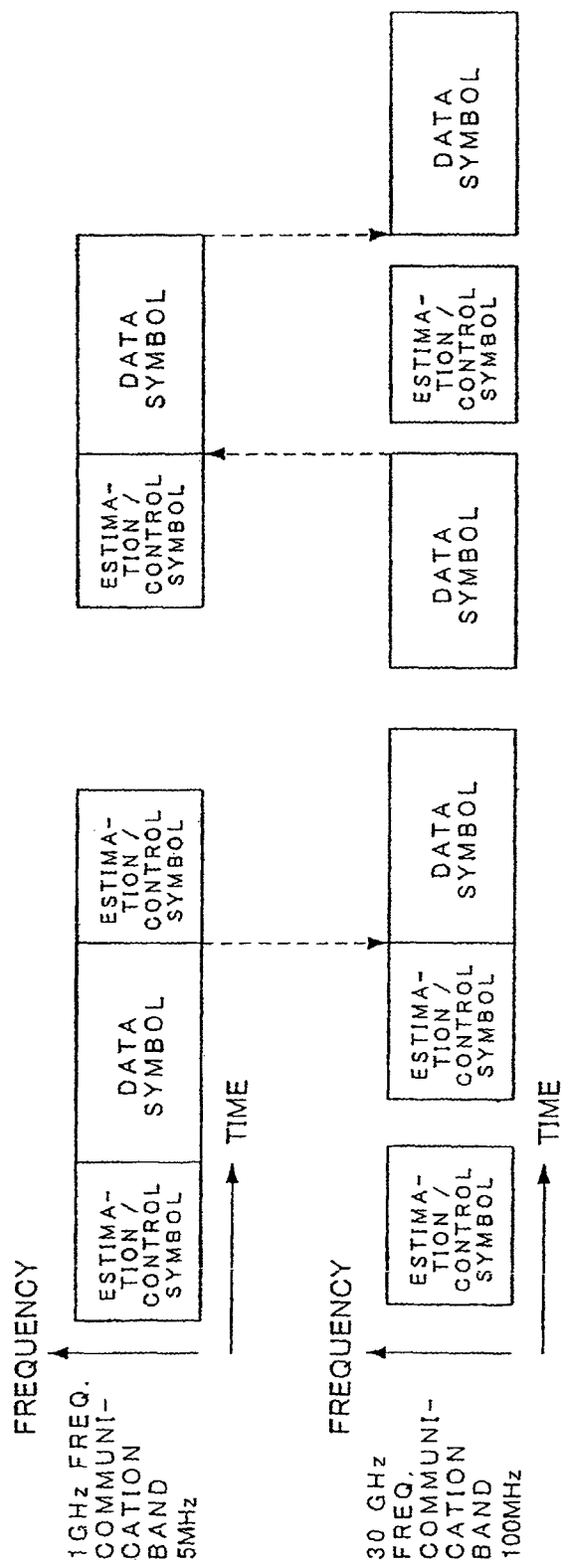
FIG. 29 is a diagram illustrating the contents of a transmission signal from a wireless base station apparatus according to Embodiment 5.

FIG. 29 illustrates the format of transmission signals outputted from antennae 105 and 106. Added to data symbols, estimation symbols which are used for estimating radio propagation conditions at the side of terminal 200, and control symbols which notify terminal 200 as to which frequency band of signal is transmitted in order to control the reception demodulation operation of terminal 200, are transmitted. This estimation symbol and control symbol may alternatively be prefixed or suffixed to a data symbol, or they may be transmitted in every set interval.

With reference now back to FIG. 28, the configuration of reception system of wireless base station apparatus 100 is explained here. When wireless base station apparatus 100 receives a signal from terminal 200 at antenna 107, the received signal is sent out to demodulation section 109 via wireless section 108. The signal demodulated at demodulation section 109 is sent out to signal de-multiplex section 110. Signal de-multiplex section 110 de-multiplexes the demodulated reception signal into data signal S200, radio propagation conditions estimation information S201, and request information S202, and the section 110 sends out the radio propagation conditions estimation information S201 and the request information S202 to transmission method determination section 111. Here, the radio propagation conditions estimation information S201 is information which indicates reception quality when terminal 200 receives a signal from wireless base station apparatus 100. Request information S202 is information indicating the request transmission rate, request modulation scheme, request transmission quality, which are requested by terminal 200.

In addition to the radio propagation conditions estimation information S201 and the request information S202, communications traffic information S203 from RNC (Radio Network Controller) is inputted into transmission method determination section 111, and based on these information, transmission method determination section 111 determines which signal, either 1 GHz band signal or 30 GHz band signal, should be transmitted to each terminal 200, and outputs the result of the determination as control signal S100 for controlling modulation sections 101 and 102 and wireless sections 103 and 104. Specifically, as long as communications traffic allows, a 1 GHz signal is transmitted when radio propagation conditions is poor while a 30 GHz signal is transmitted when radio propagation conditions is good.

As described above, wireless base station apparatus 100 according to the present embodiment is configured to perform transmission by making selection as to whether transmission is made to its target terminal with a transmission digital signal in 1 GHz band or in 30 GHz band in accordance with radio propagation conditions information or request information sent from the terminal at the other end of communications.

Figure 30:
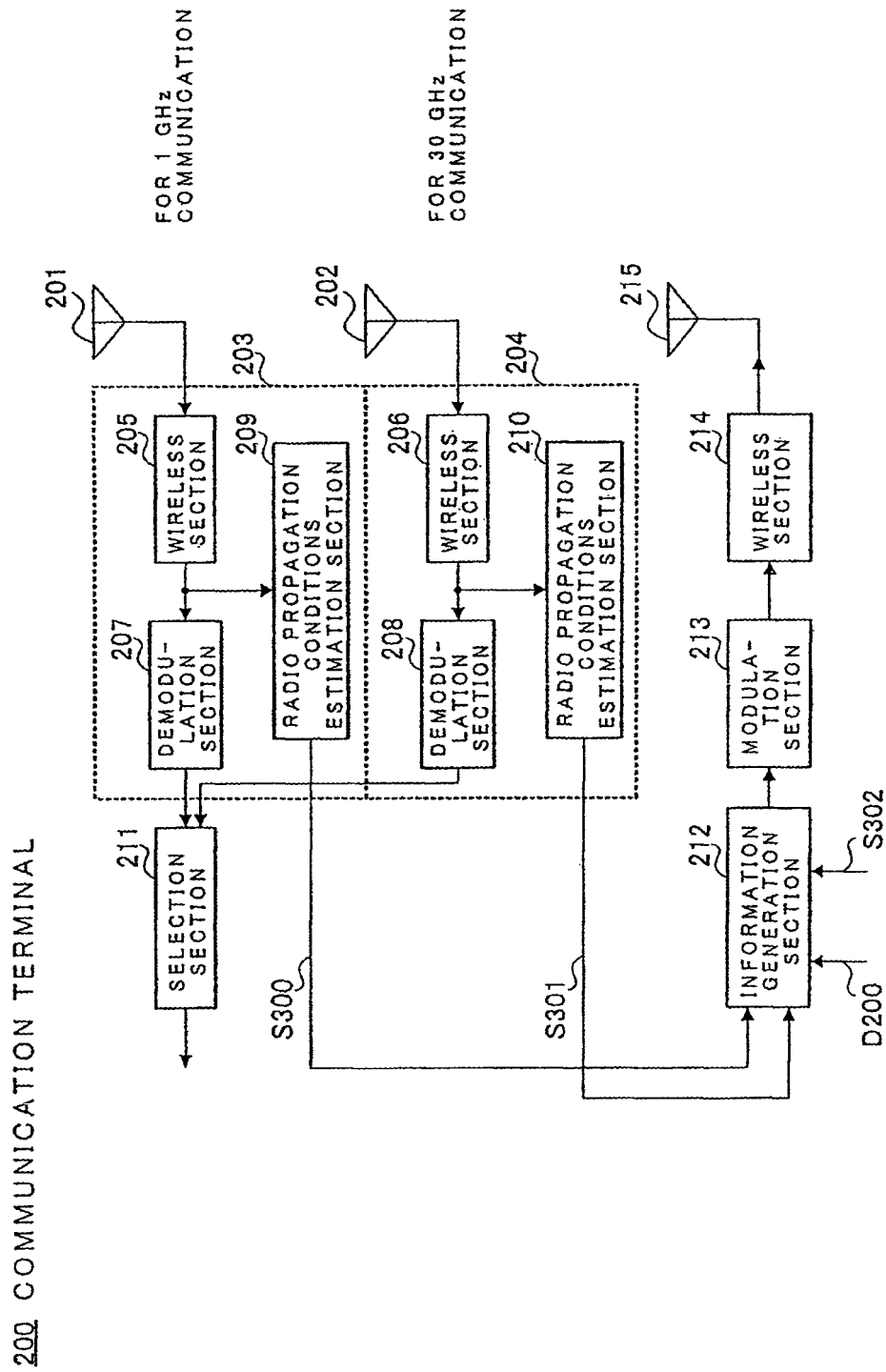
FIG. 30 is a block diagram illustrating the configuration of a communications terminal according to Embodiment 5.

Next, with reference to FIG. 30, the configuration of communication terminal 100 which conducts communication with wireless base station apparatus 100 is explained. Communication terminal 200 is devised to receive and demodulate a 1 GHz band signal or a 30 GHz band signal transmitted from wireless base station apparatus 100 in a selective manner.

First, an explanation is given on reception system. Communication terminal 200 accepts the input of a signal received by antenna 201 at 1 GHz band reception processing section 203, and terminal 200 also accepts the input of a signal received by antenna 202 at 30 GHz band reception processing section 204. Wireless section 205 in 1 GHz band reception processing section 203 applies a 1 GHz carrier to the received signal. On the other hand, wireless section 206 in 30 GHz band reception processing section 204 applies a 30 GHz carrier to the received signal. By this means, detection processing is performed on the 1 GHz band reception signal and the 30 GHz band reception signal, and the processed signals are sent out to demodulation section 207 and demodulation section 208, and radio propagation conditions estimation section 209 and radio propagation conditions estimation section 210 respectively.

Demodulation processing sections 207 and 208 perform demodulation processing respectively on the signals after the radio processing, and sends out the demodulated signals to selection section 211. In accordance with control information contained in the demodulated signals (that is, information indicating in which band, 1 GHz band or 30 GHz band, base station 100 transmitted transmission data to the terminal), the section 211 outputs either one of the output signal from demodulation section 207 and the output signal from demodulation section 208 in a selective manner. This makes it possible for the terminal to receive and demodulate the transmission data to obtain a reception digital signal regardless of whether wireless base station apparatus 100 transmitted the transmission data by piggybacking thereof onto a 1 GHz carrier or onto a 30 GHz carrier.

Radio propagation conditions estimation sections 209 and 210 estimate communication conditions in 1 GHz band and communication conditions in 30 GHz band respectively based on known signals provided for estimation of radio propagation conditions in output signals from wireless section 205 and wireless section 206. Specifically, these sections estimate radio propagation conditions with the base station at the other end in 1 GHz band and 30 GHz band respectively by measuring the reception signals on their multi-path, electric field intensity, Doppler frequency, interference power, disturbance wave intensity, delay profile, direction of wave arrival, polarization conditions, and so forth.

Herein, because a signal having traveled in 1 GHz band tends to be degraded in a different degree from a signal having traveled in 30 GHz band (for example, as described above, a signal having traveled in 30 GHz band attenuates in a greater degree over a propagation path), a value estimated at radio propagation conditions estimation section 209 and a value estimated at radio propagation conditions estimation section 210 differ from each other. Radio propagation conditions estimation information S300 estimated at radio propagation conditions estimation section 209 and radio propagation conditions estimation information S301 estimated at radio propagation conditions estimation section 210 are sent out to information generation section 212 on transmission system.

Figure 31:
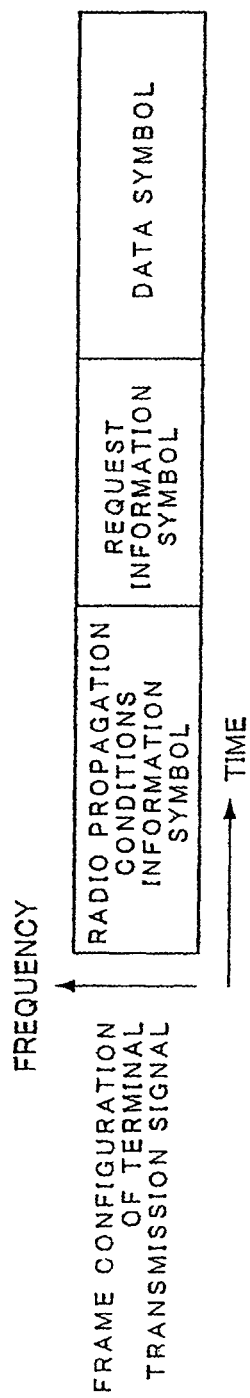
FIG. 31 is a diagram illustrating the contents of a transmission signal from a communications terminal according to the embodiment.

In addition to two radio propagation conditions estimation information S300 and S301, transmission data D200 and request information S302 is inputted into information generation section 212. Information generation section 212 forms a signal having a frame format as illustrated in FIG. 31 out of these data and information. This signal is subjected to modulation at modulation section 213, and the signal is sent out from antenna 215 after being up-converted into radio frequency at wireless section 214.

As described above, communication terminal 200 is devised to perform selective demodulation of 1 GHz signals and 30 GHz signals transmitted from wireless base station apparatus 100, and also to notify communication conditions in 1 GHz band and communication conditions in 30 GHz band to wireless base station 100.

Thus, according to the above configuration, it is possible to realize both high-speed communications and high-quality communications in a compatible manner, achieved by selecting either one of different frequency bands in accordance with radio propagation conditions between a transmission destination station and the transmitting station itself or in accordance with a request from the transmission destination station.

(Other Embodiments)

Figure 32:
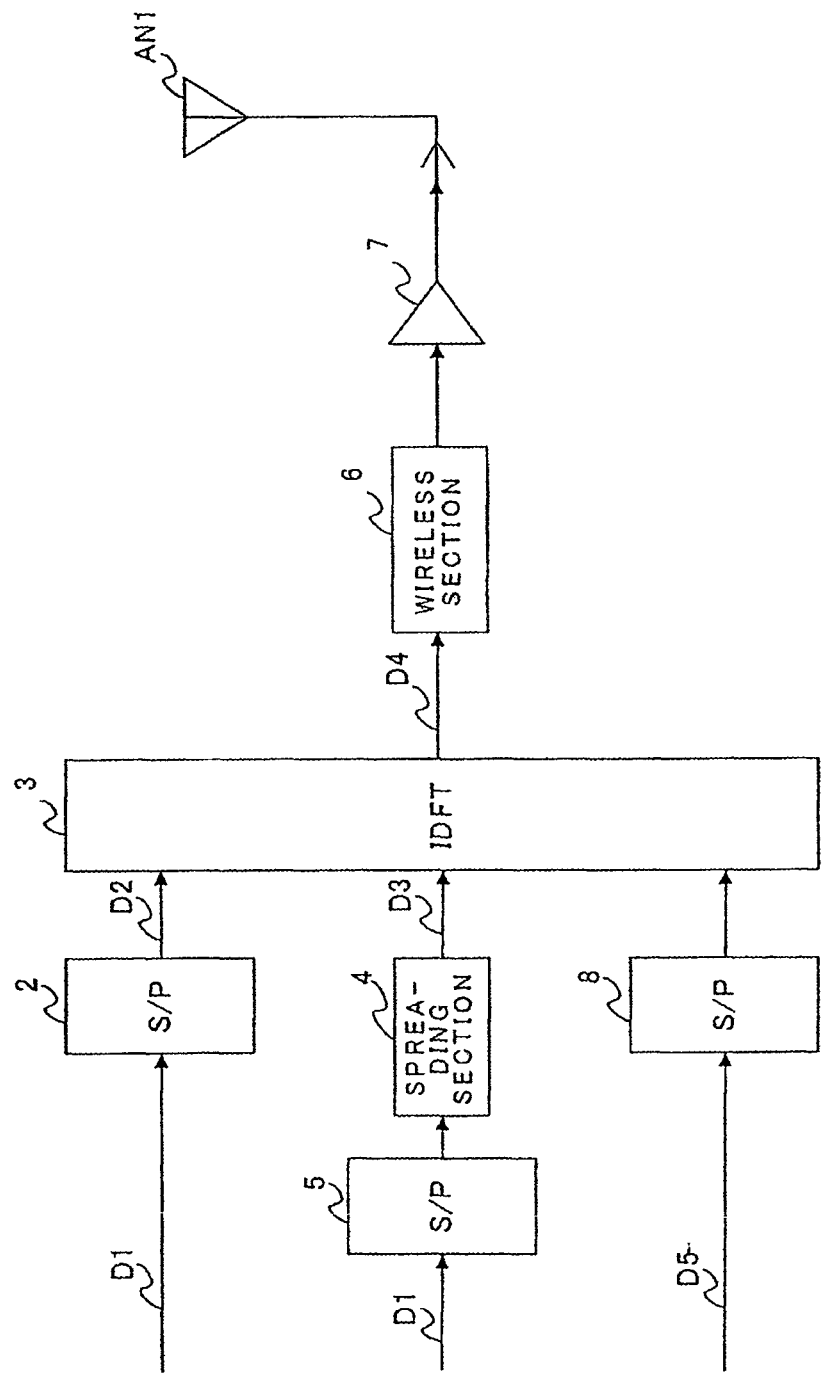
FIG. 32 is a block diagram illustrating the configuration of a transmission section of a wireless base station apparatus according to other embodiment.

Though the above Embodiment 1 describes a case where a wireless base station apparatus is configured as illustrated in FIG. 7, it may be alternatively configured as illustrated in FIG. 32. That is, wireless base station apparatus 300 shown in FIG. 32 where identical reference numerals are assigned for parts corresponding to those in FIG. 7 has a configuration in which the connected positions of spreading section 4 and serial/parallel converting section 5 are reversed. That is, each data after serial-to-parallel conversion is processed for spreading at spreading section 4.

Figure 33:
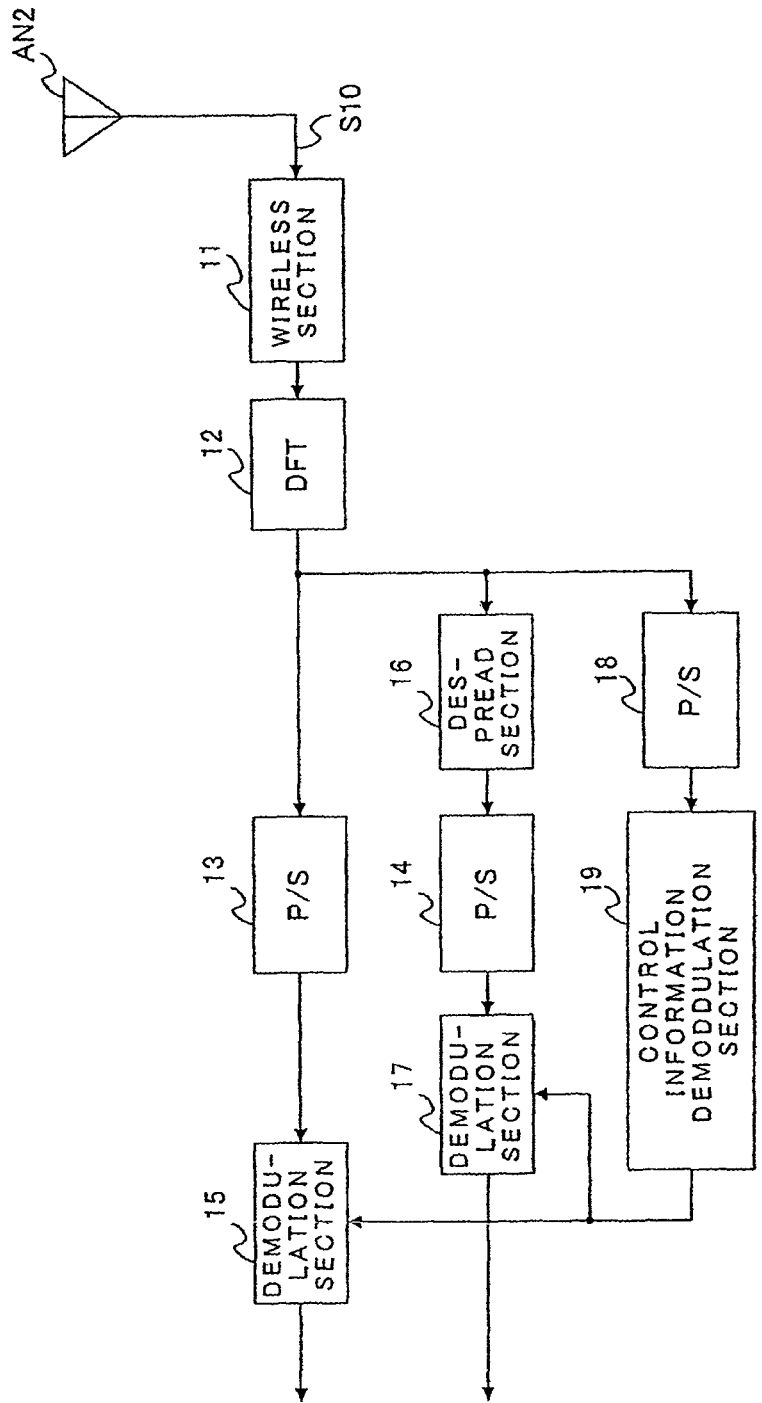
FIG. 33 is a block diagram illustrating the configuration of a reception section of a communications terminal according to other embodiment.

Likewise, though Embodiment 1 describes a case where a communication terminal is configured as illustrated in FIG. 8, it may be alternatively configured as illustrated in FIG. 33. That is, communication terminal 310 shown in FIG. 33 where identical reference numerals are assigned for parts corresponding to those in FIG. 8 has a configuration in which the connected positions of despread section 16 and parallel/serial converting section 14 are reversed. Namely, signals after despread processing at despread section 16 is processed for parallel-to-serial conversion.

Figure 34:
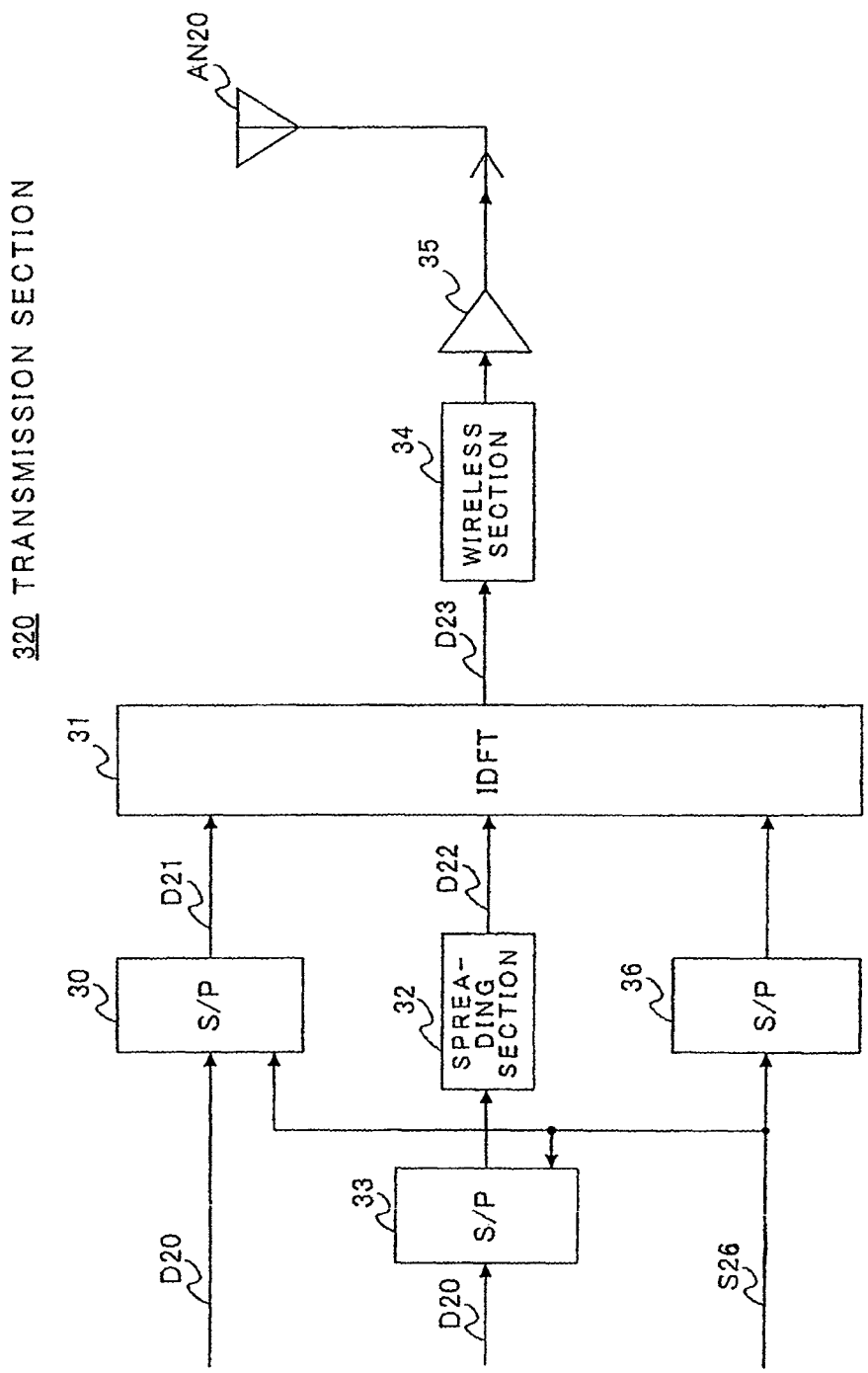
FIG. 34 is a block diagram illustrating the configuration of a transmission section of a wireless base station apparatus according to other embodiment.

In addition, transmission section 21 of wireless base station apparatus 20 according to the above Embodiment 2 may be alternatively configured as illustrated in FIG. 34. That is, transmission section 320 shown in FIG. 34 where identical reference numerals are assigned for parts corresponding to those in FIG. 13 has a configuration in which the connected positions of spreading section 32 and serial/parallel converting section 33 are reversed. That is, each data after serial-to-parallel conversion is processed for spreading at spreading section 32.

Figure 35:
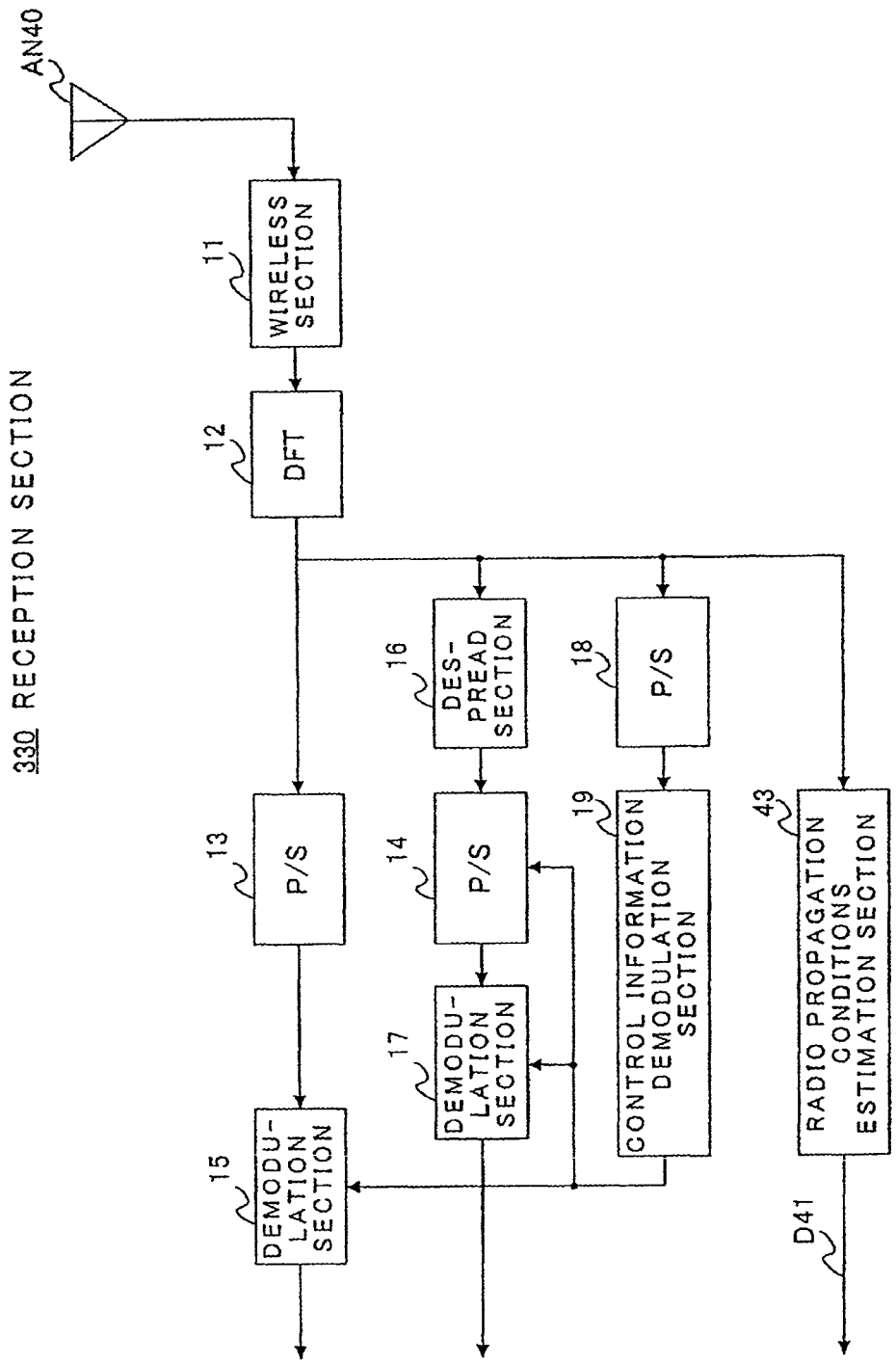
FIG. 35 is a block diagram illustrating the configuration of a reception section of a communications terminal according to other embodiment.

In the same manner, reception section 42 of communication terminal 40 according to Embodiment 2 may be alternatively configured as illustrated in FIG. 35. That is, reception section 330 shown in FIG. 35 where identical reference numeral's are assigned for parts corresponding to those in FIG. 15 has a configuration in which the connected positions of despread section 16 and parallel/serial converting section 14 are reversed. Namely, signals after despread processing at despread section 16 is processed for parallel-to-serial conversion.

Furthermore, the above described Embodiments 1 through 3 describe a case where communication terminals 10 and 40 recover original data of OFDM signals by having mixed signals pass through parallel/serial converting section 13 and demodulation section 15 while the terminals 10 and recover original data of OFDM-CDM signals by having mixed signals pass through parallel/serial converting section 14, despread section 16, and demodulation section 17 as a method for recovering original OFDM signal data and original OFDM-CDM signal data out of the mixed signals containing the OFDM signals and the OFDM-CDM signals; however, the present invention is not limited to such a configuration.

For example, it may be alternatively configured to extract OFDM signals out of mixed signals beforehand, and to recover original data of OFDM signals by having the extracted signals go through parallel/serial converting section 13 and demodulation section 15. Likewise, it may be alternatively configured to extract OFDM-CDM signals out of mixed signals beforehand, and to recover original data of OFDM-CDM signals by having the extracted signals go through parallel/serial converting section 14, despread section 16, and demodulation section 17.

In addition, in the above-described Embodiment 2, though an explanation is given on a case where a transmission signal to each communications terminal is switched between an OFDM signal and an OFDM-CDM signal in accordance with the reception conditions of a transmission target communications terminal, the present invention is not limited to such a case; alternatively, it is possible to produce the same effects as those in the above Embodiment 2 by adopting a configuration to transmit OFDM signals to a communications terminal when the distance to the terminal is shorter than a predetermined value and to transmit OFDM-CDM signals to the communications terminal when the distance to the terminal is longer than the predetermined value, determined depending the distance to the terminal.

Furthermore, the above Embodiments 1 through 5 are described with an example where a wireless communication apparatus according to the present invention is applied to a wireless base station apparatus, assuming that transmission is made from a wireless base station apparatus to a communication terminal; however, the present invention is not limited to such an example but is also applicable broadly to other communications between communication terminals conducting wireless communication between them.

Moreover, the above embodiments describe a case where a transmission signal is switched adaptively between an OFDM signal and an OFDM-CDM signal or between a high frequency signal and a low frequency signal depending on radio propagation conditions between the transmitting station and a target station at the other end of communication, however, it may be alternatively configured to switch a modulation scheme adaptively depending on any one of delay profile information, arrival direction information, and polarization conditions information sent from the station at the other end of communication.

For example, QPSK modulation is applied on a transmission signal in a case where a delay profile measured at the communication station at the other end indicates the existence of a plurality of delay waves having high electric field intensity (indicating a large effect from the delay waves), while 16 QAM modulation is applied on a transmission signal in a case where the reception indicates the non-existence of delay waves having high electric field intensity.

In addition, QPSK modulation is applied on a transmission signal in a case where polarization conditions measured at the communication station at the other end indicates that reception polarization conditions is significantly different from transmission polarization, whereas 16 QAM modulation is applied in a case where received polarization conditions is approximately the same as transmission polarization. By doing so, it is possible to conduct both high-speed communication and high-quality communication in a compatible manner likewise the above embodiments.

The present invention is not limited to the above-described embodiments but can be embodied in its variations and alterations.

A wireless communication apparatus according to the present invention adopts a configuration which comprises an OFDM modulation section that forms OFDM signals by performing orthogonal frequency division multiplex processing on transmission signals; an OFDM-spread modulation section that forms OFDM-spread signals by performing spreading processing and orthogonal frequency division multiplex processing on transmission signals; a frame configuration section that configures a transmission frame in which the OFDM signals formed by said OFDM modulation section and the OFDM-spread signals formed by said OFDM-spread modulation section are mixed; and a transmission section that transmits transmission frame signals configured by said frame configuration section.

According to this configuration, it is possible to transmit data in a very high transmission rate under OFDM modulation, and in addition, it is possible to transmit data in a higher quality under OFDM-spread modulation than under OFDM modulation, although it is slightly inferior to OFDM modulation in terms of high rate transmission. Accordingly, it is possible to realize a wireless communication apparatus having a great excellence in terms of high-quality transmission and high-speed transmission.

In a wireless communication apparatus according to the present invention, a frame configuration section configures a transmission frame by placing OFDM signals and OFDM-spread signals in a mixed manner on an identical frequency band and by aligning either one of the signals along the direction of the frequency axis at each point in time when viewed on frequency-time axial relationship.

In a wireless communication apparatus according to the present invention, a frame configuration section configures a transmission frame by placing OFDM signals and OFDM-spread signals in a mixed manner on an identical time and by aligning either one of the signals along the direction of the time axis at each frequency band when viewed on frequency-time axial relationship.

According to these configurations, it is possible to transmit mixed signals formed by using OFDM modulation and OFDM-spread modulation while using limited frequency bands in an effective manner.

In a wireless communication apparatus according to the present invention, a frame configuration section configures a transmission frame by switching a transmission signal to each transmission destination station between an OFDM signal and an OFDM-spread signal in accordance with radio propagation conditions between the transmitting station and each transmission destination station.

According to this configuration, it is possible to achieve both high-quality data transmission and high-speed data transmission with a greater compatibility by transmitting OFDM signals to a transmission destination apparatus when radio propagation conditions between the transmitting station and the transmission destination station is good, which means that signal degradation during its traveling is small, while transmitting OFDM-spread signals to a transmission destination apparatus when radio propagation conditions between the transmitting station and the transmission destination station is poor, which means that signal degradation during its traveling is large.

In a wireless communication apparatus according to the present invention, a frame configuration section configures a transmission frame in accordance with the distance to a transmission destination station by selecting OFDM signals as signals to be transmitted to the transmission destination station when the distance to the transmission destination station is shorter than a predetermined value while selecting OFDM-spread signals as signals to be transmitted to the transmission destination station when the distance to the transmission destination station is longer than a predetermined value.

According to this configuration, it is possible to achieve both high-quality data transmission and high-speed data transmission in a compatible manner by transmitting OFDM signals to a transmission destination apparatus when the distance to the transmission destination station is shorter than the predetermined value, which means that signal degradation during its traveling is small, while transmitting OFDM-spread signals to a transmission destination apparatus when the distance to the transmission destination station is longer than the predetermined value, which means that signal degradation during its traveling is large.

In a wireless communication apparatus according to the present invention, radio propagation conditions contain any one of delay profile, direction of wave arrival, polarization conditions of reception signals get at a station at the other end of communication.

According to this configuration, it is possible to accurately estimate radio propagation conditions which might affect the reception quality of the station at the other end of communication, which makes it further possible to make unerring switching between OFDM signals and OFDM-spread signals so as to achieve high-quality transmission and high-speed transmission in a compatible manner.

A wireless communication apparatus according to the present invention selects whether to transmit OFDM signals or OFDM-spread signals as signals to a transmission destination station in accordance with request information from the transmission destination station.

According to this configuration, it is possible to switch between OFDM modulation and OFDM-spread modulation in accordance with data quality or data transmission amount requested by a transmission destination apparatus, which makes it further possible for the transmission destination apparatus to receive data in desired quality or in desired transmission amount.

In a wireless communication apparatus according to the present invention, a frame configuration section configures a transmission frame in such a configuration that time for transmission of OFDM-spread signals and time for transmission of OFDM signals is fixed in one transmission frame.

According to this configuration, processing at the time of configuring a transmission frame becomes easier. In addition, it makes demodulation processing easier at the time of receiving and demodulating the transmission frame at a transmission destination station because the transmission destination station is able to separate time for demodulation of OFDM-spread signals and time for demodulation of OFDM signals. Consequently, it is possible to simplify system design. Moreover, because the boundary of OFDM-spread signals and OFDM signals is fixed, it is not necessary to send frame information indicating such a boundary, which contributes to the reduction in the amount of transmission information.

In a wireless communication apparatus according to the present invention, a frame configuration section configures a transmission frame in such a configuration that time for transmission of OFDM-spread signals and time for transmission of OFDM signals is variable in accordance with the number of transmission destination stations to which the OFDM-spread signals are transmitted and the number of transmission destination stations to which the OFDM signals are transmitted in one transmission frame.

According to this configuration, it is possible to achieve fairness of data transmission in terms of the volume of transmission data for each transmission destination station because it is possible to allocate a fixed time to each transmission destination station in one transmission frame.

In a wireless communication apparatus according to the present invention, a frame configuration section configures a transmission frame in such a configuration that frequency bands used for OFDM-spread signals and frequency bands used for OFDM signals are fixed in one transmission frame.

According to this configuration, processing at the time of configuring a transmission frame becomes easier. In addition, it makes demodulation processing easier at the time of receiving and demodulating the transmission frame at a transmission destination station because the transmission destination station is able to separate frequency bands for demodulation of OFDM-spread signals and frequency bands for demodulation of OFDM signals. Consequently, it is possible to simplify system design. Moreover, because the boundary of OFDM-spread signals and OFDM signals is fixed, it is not necessary to send frame information indicating such a boundary, which contributes to the reduction in the amount of transmission information.

In a wireless communication apparatus according to the present invention, a frame configuration section configures a transmission frame in such a configuration that frequency bands used for OFDM-spread signals and frequency bands used for OFDM signals are variable in accordance with the number of transmission destination stations to which the OFDM-spread signals are transmitted and the number of transmission destination stations to which the OFDM signals are transmitted in one transmission frame.

According to this configuration, it is possible to achieve fairness of data transmission in terms of the volume of transmission data for each transmission destination station because it is possible to allocate fixed frequency band to each transmission destination station in one transmission frame.

In a wireless communication apparatus according to the present invention, the signal point positions of signals processed by OFDM modulation section on I-Q plane mismatch with the signal point positions of signals processed by OFDM-spread modulation section on I-Q plane.

According to this configuration, because it is possible to reduce interferences between OFDM signals and OFDM-spread signals, it is further possible to improve the reception quality of each modulation signal. Especially, it is possible to reduce degradation in reception quality due to interferences between OFDM signals and OFDM-CDM signals in adjacent other cells.

A wireless communication apparatus according to the present invention controls each of the transmission level of OFDM signals and the transmission level of OFDM-spread signals independently.

According to this configuration, because it is possible to control each of the communication area limit of OFDM signals and the communication area limit of OFDM-spread signals independently, which offers diversities in cell-structuring.

A wireless communication apparatus according to the present invention adopts a configuration which comprises the first radio signal formation section that forms the first radio signal by superposing transmission data addressed to a transmission destination station onto the first carrier; the second radio signal formation section that forms the second radio signal by superposing transmission data addressed to a transmission destination station onto the second carrier having a higher frequency than the first carrier; and a selection section that selects either the first radio signal or the second radio signal to have the selected signal transmitted from an antenna.

According to this configuration, it is possible to carry out data transmission with lesser degradation in quality, for example, by selecting the first radio signal to stations at the other end of communications which are located long distances away to transmit data. On the other hand, it is possible to perform data transmission at a high rate by selecting the second radio signal having a higher frequency than the first radio signal to stations at the other end of communications which are located short distances away to transmit data. Consequently, it is possible to realize both high-speed communications and high-quality communications in a compatible manner.

In a wireless communication apparatus according to the present invention, a selection section selects either the first radio signal or the second radio signal in accordance with radio propagation conditions in between the transmission destination station.

According to this configuration, it is possible to achieve both high-quality data transmission and high-speed data transmission with a greater compatibility by transmitting the second high-frequency radio signals to a transmission destination apparatus when radio propagation conditions between the transmitting station and the transmission destination station is good, which means that signal degradation during its traveling is small, while transmitting the first low-frequency signals to a transmission destination apparatus when radio propagation conditions between the transmitting station and the transmission destination station is poor, which means that signal degradation during its traveling is large.

In a wireless communication apparatus according to the present invention, in accordance with the distance to a transmission destination station, a selection section selects the second radio signals as signals to be transmitted to the transmission destination station when the distance to the transmission destination station is shorter than a predetermined value, while selecting the first radio signals as signals to be transmitted to the transmission destination station when the distance to the transmission destination station is longer than a predetermined value.

According to this configuration, because signal attenuation on a propagation path is small even for a high-frequency radio wave when the distance to the transmission destination station is shorter than a predetermined value, data transmission is conducted at a high rate by transmitting the second radio signal to the transmission destination station. Contrarily, because signal attenuation on a propagation path is too large unless a low-frequency radio wave is used when the distance to the transmission destination station is longer than a predetermined value, data transmission is conducted at a rate which achieves lesser degradation by transmitting the first radio signal to the transmission destination station. Consequently, it is possible to achieve a high-quality data transmission and a high-speed data transmission in a compatible manner.

In a wireless communication apparatus according to the present invention, the radio propagation conditions contain any one of delay profile, direction of wave arrival, polarization conditions of reception signals get at a station at the other end of communication.

According to this configuration, it is possible to accurately estimate radio propagation conditions which might affect the reception quality of the station at the other end of communication, which makes it further possible to make unerring switching between the first radio signals and the second radio signals so as to achieve high-quality transmission and high-speed transmission in a compatible manner.

In a wireless communication apparatus according to the present invention, a selection section selects either the first radio signal or the second radio signal in accordance with request information from a transmission destination station.

According to this configuration, it is possible to switch between the first radio signal and the second radio signal in accordance with data quality or data transmission amount requested by a transmission destination apparatus, which makes it further possible for the transmission destination apparatus to receive data in desired quality or in desired transmission amount.

In a wireless communication apparatus according to the present invention, the signal point positions of the first radio signals on I-Q plane mismatch with the signal point positions of the second radio signals on I-Q plane.

According to this configuration, it is possible to reduce interferences between the first radio signals and the second radio signals when transmitting the first radio signals and the second radio signals to a plurality of destination stations in a selective manner.

As described above, according to the present invention, it is possible to realize a wireless communication apparatus and a wireless communication method for achieving both high-speed and high-quality communication in a compatible manner, which is realized by performing OFDM processing and OFDM-CDM processing on transmission data and by transmitting the two types of modulation signals formed by the two modulation schemes, that is, OFDM signals and OFDM-CDM signals.

In addition, it is possible to realize a wireless communication apparatus and a wireless communication method for achieving both high-speed and high-quality communication in a compatible manner, which is realized by selecting whether to transmit transmission data to a transmission destination apparatus in the first frequency band or in the second frequency band, which is higher than the first frequency band, and then by performing transmission therewith.

Furthermore, it is possible to reduce transmission of unnecessary data when transmitting two types of signals, OFDM signals and OFDM-CDM signals (or, the first frequency signal and the second frequency signal), achieved by switching modulation schemes for signals to be transmitted in advance between the OFDM signals and the OFDM-CDM signals (or, the first frequency signal and the second frequency signal). Consequently, in addition to the compatible achievement of high-speed communication and high-quality communication, it is possible to utilize limited propagation path resources effectively, and it is also possible to increase the actual data transmission efficiency of a wireless communication apparatus.

This specification is based on the Japanese Patent Application No. 2001-257027 filed on Aug. 27, 2001, and the Japanese Patent Application No. 2002-231976 filed on Aug. 8, 2002, entire content of which is expressly incorporated by reference herein.

Industrial Applicability

The present invention is suitably applicable to a wireless communications system in which wireless transmission of a bulk of information such as image information, etc., with high rate and high quality is required.

We claim:

1. A wireless communication method for a transmission apparatus that transmits an OFDM (orthogonal frequency division multiplexing) signal using a communication band, which comprises a plurality of subcarrier groups each including a plurality of subcarriers, the method comprising:
specifying which subcarrier group and how many subcarriers are to be used to transmit the OFDM signal and determining a configuration of a transmission frame;
generating the OFDM signal by mapping data symbols according to the determined configuration of the transmission frame; and
transmitting the generated OFDM signal, wherein:
a number of subcarriers included in each subcarrier group is variable;
the OFDM signal is generated using a plurality of modulation schemes including QPSK (quadrature phase shift keying) and 16QAM (quadrature amplitude modulation);
a plurality of mapping patterns are prepared for each of the plurality of modulation schemes, each mapping pattern indicating a combination of candidate positions of signal points on an IQ (in-phase quadrature) plane; and
combinations of candidate positions of signal points based on mapping patterns other than a first mapping pattern included in the plurality of mapping patterns are generated by rotating a first combination of candidate positions of signal points based on the first mapping pattern, in a same direction, around the origin on the IQ plane.

2. The wireless communication method according to claim 1, wherein:
each of the plurality of mapping patterns defines a relationship between input bit sets and signal points on the IQ plane corresponding to the input bit sets; and
each of the signal points on the IQ plane corresponding to the input bit sets according to the mapping patterns other than the first mapping pattern is generated by rotating a phase of a signal point on the IQ plane corresponding to the input bit set according to the first mapping pattern, in the same direction, around the origin on the IQ plane.

3. The wireless communication method according to claim 1,
wherein which subcarrier group is to be used to transmit the OFDM signal specifies per transmission frame.

4. The wireless communication method according to claim 1,
wherein how many subcarriers are to be used to transmit the OFDM signal specifies per transmission frame.

5. A transmission apparatus that transmits an OFDM (orthogonal frequency division multiplexing) signal using a communication band, which comprises a plurality of subcarrier groups each including a plurality of subcarriers, the transmission apparatus comprising:
a frame configuration determining section that specifies which subcarrier group and how many subcarriers are to be used to transmit the OFDM signal and determines a configuration of a transmission frame;
an OFDM signal generating section that generates the OFDM signal by mapping data symbols according to the determined configuration of the transmission frame; and
a transmission section that transmits the generated OFDM signal, wherein:
a number of subcarriers included in each subcarrier group is variable;
the OFDM signal is generated using a plurality of modulation schemes including QPSK (quadrature phase shift keying) and 16QAM (quadrature amplitude modulation);
a plurality of mapping patterns are prepared for each of the plurality of modulation schemes, each mapping pattern indicating a combination of candidate positions of signal points based on an origin of an IQ (in-phase quadrature) plane; and
combinations of candidate positions of signal points based on mapping patterns other than a first mapping pattern included in the plurality of mapping patterns are generated by rotating a first combination of candidate positions of signal points based on the first mapping pattern, in a same direction, around the origin on the IQ plane.

6. The transmission apparatus according to claim 5,
wherein each of the plurality of mapping patterns defines a relationship between input bit sets and signal points on the IQ plane corresponding to the input bit sets; and
each of the signal points on the IQ plane corresponding to the input bit sets according to the mapping patterns other than the first mapping pattern is generated by rotating a phase of a signal point on the IQ plane corresponding to the input bit set according to the first mapping pattern, in the same direction, around the origin on the IQ plane.

7. The transmission apparatus according to claim 5, wherein which subcarrier group is to be used to transmit the OFDM signal specifies per transmission frame.

8. The transmission apparatus according to claims 5, wherein how many subcarriers are to be used to transmit the OFDM signal specifies per transmission frame.

* * * * *

UNITED STATES PATENT AND TRADEMARK OFFICE
CERTIFICATE OF CORRECTION

PATENT NO.        : 8,976,643 B2          Page 1 of 1
APPLICATION NO.   : 13/780869
DATED             : March 10, 2015
INVENTOR(S)       : Yutaka Murakami et al.

It is certified that error appears in the above-identified patent and that said Letters Patent is hereby corrected as shown below:

In the Claims

In column 31, line 6 (claim 8, line 1), the expression "to claims 5" should read -- to claim 5 --.

Signed and Sealed this
Thirtieth Day of June, 2015

Michelle K. Lee
*Director of the United States Patent and Trademark Office*